(12) United States Patent
Backus

(10) Patent No.: US 11,786,031 B1
(45) Date of Patent: Oct. 17, 2023

(54) GRIP FOR PORTABLE ELECTRONIC DEVICES

(71) Applicant: ohSnap, Inc., Apex, NC (US)

(72) Inventor: Dale Backus, Broadway, NC (US)

(73) Assignee: ohSnap, Inc., Apex, NC (US)

( * ) Notice: Subject to any disclaimer, the term of this patent is extended or adjusted under 35 U.S.C. 154(b) by 0 days.

(21) Appl. No.: 18/055,043

(22) Filed: Nov. 14, 2022

Related U.S. Application Data

(63) Continuation of application No. 17/931,638, filed on Sep. 13, 2022.

(51) Int. Cl.
*A45F 5/10* (2006.01)
*A45F 5/00* (2006.01)

(52) U.S. Cl.
CPC .......... *A45F 5/10* (2013.01); *A45F 2005/002* (2013.01); *A45F 2200/0516* (2013.01); *A45F 2200/0525* (2013.01)

(58) Field of Classification Search
CPC ................ A45F 5/10; A45F 2200/0516; A45F 2200/0508; A45C 2200/15; F16M 11/10; F16M 13/022; F16M 13/04; F16M 11/38; F16M 11/40
USPC ........................................ 361/679.59; 224/930
See application file for complete search history.

(56) References Cited

U.S. PATENT DOCUMENTS

| | | | |
|---|---|---|---|
| 3,781,922 A | 1/1974 | Ericson | |
| 4,111,407 A | 9/1978 | Stager | |
| 8,540,452 B2 * | 9/2013 | Jimenez | E05D 1/02 403/220 |
| 8,560,031 B2 | 10/2013 | Barnett et al. | |
| 8,919,838 B2 * | 12/2014 | Zimmermann | A47G 21/10 2/21 |
| 9,800,283 B2 | 10/2017 | Schmidt | |
| 9,804,636 B2 | 10/2017 | Barnett et al. | |
| D818,808 S | 5/2018 | Barnett | |
| 9,958,107 B1 | 5/2018 | Hobbs et al. | |

(Continued)

FOREIGN PATENT DOCUMENTS

| | | |
|---|---|---|
| CA | 3034278 A1 | 2/2018 |
| CA | 3058644 A1 | 10/2018 |

(Continued)

OTHER PUBLICATIONS

"Oh Snap Grip: How Smart People Use Smartphones", (BACKUS), May 16, 2020; https://www.kickstarter.com/projects/ohsnapofficial/ohsnap-grip-how-smart-people-use-smartphones/.

(Continued)

*Primary Examiner* — Adam J Waggenspack
(74) *Attorney, Agent, or Firm* — Stanek Lemon Crouse & Meeks, PA

(57) ABSTRACT

A finger grip adherable to a portable electronic device and configured to provide a deployable tool to assist a user in holding portable electronic device. The finger grip includes a base portion, a cap portion, and a flexure bearing. The cap portion is moveable between a captured position where the cap portion contacts the base portion and a relaxed position where the cap portion is separated from the base portion by a gap. The flexure bearing is coupled to the base portion and to the cap portion, and the flexure bearing provides at least one compliant degree of freedom to allow the cap portion to move between captured position and the relaxed position.

24 Claims, 13 Drawing Sheets

(56) References Cited

U.S. PATENT DOCUMENTS

| | | | |
|---|---|---|---|
| 9,970,589 B2 | 5/2018 | Hobbs et al. | |
| 10,030,807 B1 | 7/2018 | Hobbs et al. | |
| 10,054,259 B2 | 8/2018 | Hobbs et al. | |
| 10,060,573 B2 | 8/2018 | Hobbs et al. | |
| D835,091 S | 12/2018 | Torrance | |
| 10,200,518 B2 | 2/2019 | Richter | |
| 10,215,329 B2 | 2/2019 | Hobbs et al. | |
| 10,317,005 B2 | 6/2019 | Hobbs et al. | |
| 10,386,009 B2 | 8/2019 | Hobbs et al. | |
| 10,463,116 B2 | 11/2019 | Barnett et al. | |
| D878,039 S | 3/2020 | Cantoli-Alves et al. | |
| D879,086 S | 3/2020 | Nahum et al. | |
| 10,638,627 B1 | 4/2020 | Stime | |
| 10,655,775 B2 | 5/2020 | Hobbs et al. | |
| 10,724,280 B1 * | 7/2020 | Srour | F16M 11/121 |
| 10,742,251 B2 | 8/2020 | Barnett et al. | |
| 10,774,871 B1 * | 9/2020 | Srour | F16C 11/12 |
| D901,483 S | 11/2020 | Kory et al. | |
| 10,841,410 B2 | 11/2020 | Nahum et al. | |
| D907,025 S | 1/2021 | Corraliza et al. | |
| 10,897,984 B2 | 1/2021 | Roth et al. | |
| 10,972,596 B1 | 4/2021 | Blau | |
| D921,359 S | 6/2021 | Roth et al. | |
| 11,051,592 B2 | 7/2021 | Barnett | |
| 11,149,902 B2 | 10/2021 | Barnett | |
| D938,408 S | 12/2021 | Nahum et al. | |
| 11,303,743 B2 | 4/2022 | Chen et al. | |
| 11,330,093 B2 * | 5/2022 | Backus | H04M 1/04 |
| D967,813 S | 10/2022 | Bargen et al. | |
| D968,383 S | 11/2022 | Nahum et al. | |
| 11,530,779 B2 * | 12/2022 | Epstein | F16M 13/04 |
| 2007/0206275 A1 | 9/2007 | Hemmer et al. | |
| 2010/0072334 A1 * | 3/2010 | Le Gette | F16M 11/10 |
| | | | 29/428 |
| 2011/0216933 A1 | 9/2011 | Lan | |
| 2013/0126691 A1 | 5/2013 | Miklas | |
| 2015/0060307 A1 | 3/2015 | Barnett | |
| 2015/0380139 A1 | 12/2015 | Hsu et al. | |
| 2016/0069512 A1 | 3/2016 | Grieve | |
| 2016/0282907 A1 | 9/2016 | Barnett et al. | |
| 2017/0318697 A1 | 11/2017 | Lebovitz | |
| 2017/0338676 A1 | 11/2017 | Yan | |
| 2018/0051851 A1 | 2/2018 | Hobbs et al. | |
| 2018/0348541 A1 | 12/2018 | Radzwill | |
| 2019/0211966 A1 | 7/2019 | Nahum et al. | |
| 2019/0215387 A1 | 7/2019 | Chiang | |
| 2019/0285223 A1 | 9/2019 | Hobbs et al. | |
| 2019/0335031 A1 | 10/2019 | Nahum et al. | |
| 2020/0140168 A1 | 5/2020 | Chiang et al. | |
| 2020/0162594 A1 | 5/2020 | Cantoli-Alves et al. | |
| 2020/0237310 A1 | 7/2020 | Lozano-Buhl et al. | |
| 2020/0314070 A1 | 10/2020 | Barnett | |
| 2020/0349873 A1 | 11/2020 | Nahum et al. | |
| 2021/0075255 A1 | 3/2021 | Nutting et al. | |
| 2021/0082125 A1 | 3/2021 | Nahum et al. | |
| 2021/0120942 A1 | 4/2021 | Cantoli-Alves et al. | |
| 2021/0124395 A1 | 4/2021 | Barnett et al. | |
| 2021/0140580 A1 | 5/2021 | Nahum et al. | |
| 2021/0301976 A1 | 9/2021 | Cohen | |
| 2021/0348716 A1 | 11/2021 | Lane et al. | |
| 2022/0096949 A1 | 3/2022 | Cantoli-Alves et al. | |
| 2022/0103667 A1 | 3/2022 | Chiang et al. | |
| 2022/0116491 A1 | 4/2022 | Chiang et al. | |
| 2022/0130229 A1 | 4/2022 | Barnett | |
| 2022/0183431 A1 | 6/2022 | Chiang et al. | |
| 2022/0206532 A1 | 6/2022 | Barnett et al. | |
| 2022/0403971 A1 | 12/2022 | Bargen et al. | |

FOREIGN PATENT DOCUMENTS

| | | |
|---|---|---|
| CN | 201491236 U | 5/2010 |
| CN | 101742376 A | 6/2010 |
| CN | 201699919 U | 1/2011 |
| CN | 111801144 A | 10/2020 |
| CN | 111801640 A | 10/2020 |
| CN | 212617109 U | 2/2021 |
| CN | 113302426 A | 8/2021 |
| CN | 114981903 A | 8/2022 |
| CN | 115243934 A | 10/2022 |
| EP | 3285466 A1 | 2/2018 |
| EP | 3742927 A1 | 12/2020 |
| EP | 3817622 A1 | 5/2021 |
| TW | M577631 U | 5/2019 |
| WO | WO 2013138500 A1 | 9/2013 |
| WO | WO 2018035349 A1 | 2/2018 |
| WO | WO 2019136363 A2 | 7/2019 |
| WO | WO 2020009795 A1 | 1/2020 |
| WO | WO 2020009796 A1 | 1/2020 |
| WO | WO 2020009808 A1 | 1/2020 |
| WO | WO 2020009809 A1 | 1/2020 |
| WO | WO 2020009820 A1 | 1/2020 |
| WO | WO 2020009967 A1 | 1/2020 |
| WO | WO 2020027940 A1 | 2/2020 |
| WO | WO 2020055560 A1 | 3/2020 |
| WO | WO 2020091903 A1 | 5/2020 |
| WO | WO 2020091904 A1 | 5/2020 |
| WO | WO 2020163797 A1 | 8/2020 |
| WO | WO 2022055803 A1 | 3/2022 |
| WO | WO 2022081747 A1 | 4/2022 |
| WO | WO 2022232384 A1 | 11/2022 |
| WO | WO 2022251467 A1 | 12/2022 |

OTHER PUBLICATIONS

International Search Report and Written Opinion dated Oct. 21, 2021, in International Application No. PCT/US2021/035514 with International Filing Date Jun. 2, 2021.

"Snap Phone Grip & Stand—MagSafe Compatible", MOFT, retrieved Sep. 27, 2022, 4 pages, available at https://www.moft.us/products/moft-o-snap-phone-stand-grip?variant=39323527872599.

* cited by examiner

GRIP FOR PORTABLE ELECTRONIC DEVICES

CROSS-REFERENCE TO RELATED APPLICATION

This is a continuation application of U.S. patent application Ser. No. 17/931,638, filed Sep. 13, 2022, the content of which is hereby incorporated herein by reference in its entirety.

FIELD

The present disclosure generally relates to physical accessories for portable electronic devices and, more particularly, to thin, reusable grips that allow electromagnetic induction therethrough.

BACKGROUND

Portable electronic devices (e.g., smartphones, tablets, laptop computers, smart watches, e-readers, music players, fitness trackers, handheld gaming consoles, etc.) have become ubiquitous in modern society. These devices are often sized to be carried in one hand and manipulated with either hand. However, frequent use can lead to hand cramping or discomfort. To address these or other challenges, accessories have been developed to ease the burden of carrying and using these portable electronic devices. One such accessory (commonly referred to as a "grip" or a "finger grip") can be attached to a device or case and can double as a kickstand, offer drop protection, and provide a more comfortable and functional means of holding the device. Example grips are disclosed in U.S. Pat. No. 11,330,093, which is assigned to Ohsnap, Inc. ("Ohsnap") of Apex, NC and is incorporated by reference herein.

Wireless charging, including Qi® wireless power transfer standards, has become increasingly popular in recent years, especially for smartphone charging. These devices utilize an alternating current charging base station that can be powered by a household power supply. The charging base station may include a transmitter coil, which can generate a magnetic field that induces a receiver coil inside of a smartphone and is known as magnetic resonance charging. Conventional finger grips are often too thick to allow wireless charging therethrough. To that end, when charging is desired, many users continue to opt for a plug-in charger or choose to physically remove the finger grip to enable wireless charging. These options are burdensome and undesirable.

BRIEF DESCRIPTION OF THE DRAWINGS

Throughout the drawings, reference numbers can be re-used to indicate correspondence between referenced elements. The drawings are provided to illustrate embodiments of the present disclosure and do not to limit the scope thereof.

DETAILED DESCRIPTION

Although certain cases and examples are described below, it will be understood that the disclosure extends beyond the specifically disclosed embodiments and/or uses and obvious modifications and equivalents thereof. Thus, it is intended that the scope of the disclosure herein disclosed should not be limited by any particular embodiments described below. Furthermore, although the certain cases and examples described herein reference a "finger grip," it will be understood that such grips should not be limited to use by a finger.

Embodiments of the inventive concept disclosed herein relate to a finger grip for portable electronics. As appreciated by the present inventors, finger grips can be uncomfortable, lack enhanced functionality, and/or do not support wireless charging therethrough.

In light of the description herein, it will be understood that the embodiments disclosed herein substantially improve finger grips for portable electronics and other portable devices. Specifically, the embodiments disclosed herein provide for a finger grip that collapses to the point where its profile is sufficiently thin to permit wireless charging therethrough. In this way, the finger grip is MagSafe® and/or Qi® compliant. By permitting wireless charging through the finger grip itself, wireless charging accessibility is greatly improved.

Furthermore, embodiments disclosed herein provide for a finger grip that is movable between a plurality of configurations. For example, the finger grip can be manipulated into a compact, low-profile position (referred to as a "captured position"), a position offering dynamically resizable finger openings (referred to as a "relaxed position"), or a position for propping a portable device up on a surface (referred to as a "kickstand position"), to name a few. Furthermore, embodiments disclosed herein provide for a finger grip that implements a flexure bearing, which facilitates comfort and ease of use by facilitating movement into any of the plurality of configurations. By enabling multiple positions, the finger grip advantageously improves functionality and comfort, among other improvements.

Figure 1:
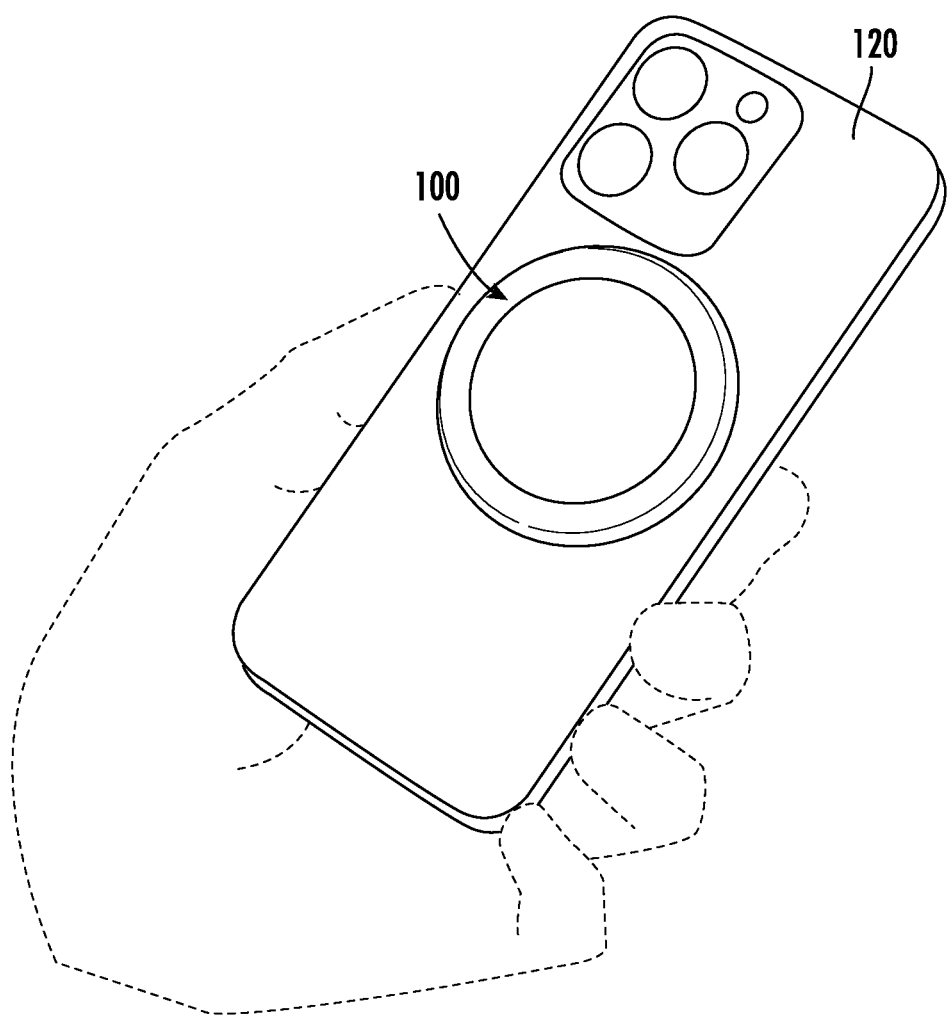
FIG. 1 illustrates an environmental view of an example finger grip in accordance with the present disclosure.

FIG. 1 illustrates an environmental view of an example finger grip in accordance with the present disclosure. The finger grip 100 is magnetically and/or adhesively adherable to the smartphone 121 to provide an easily deployable tool for holding the smartphone 121 with one or more fingers.

The particular implementation of the finger grip 100 may vary across embodiments. For example, in some cases, as illustrated in FIG. 1, the finger grip 100 may be implemented as a standalone accessory that is attachable to a portable device, such as the smartphone 121 or a case for the smartphone 121. In some such cases, the finger grip 100 can be compatible with particular brands or models and incompatible with other brands or models. For example, the finger grip 100 may be compatible with an Apple device (e.g., an iPhone) and incompatible with an Android device (e.g., a Samsung Galaxy), or compatible with an Android device and incompatible with an Apple device. Alternatively, in some cases, the finger grip 100 is universally compatible with multiple (or all) brands or models (e.g., both Apple and Android devices). As another example, in some cases, the finger grip 100 is integrated with or part of the portable device. For example, the finger grip 100 may be integrated into a smartphone case or the smartphone 121 itself.

Although illustrated as installed on a smartphone 121, it will be appreciated that the finger grip 100 may be removably coupled to any of various portable devices to assist in the holding the device. For example, a back surface of the finger grip 100 may be attachable to a portable electronic device (e.g., a game device, a cell phone, an e-reader, a smart phone, a tablet, a personal computer, a laptop, a television, a car console display, a personal digital assistant (PDA), smart glasses, a monitor) or another portable object (e.g., a book, a notepad, a soda can, a coffee mug, etc.) using magnets, adhesives, etc. Furthermore, a front surface of the finger grip 100 may be attachable to ferrous metal and magnetic surfaces (e.g., refrigerators, gym equipment, car, chargers, desk mounts, etc.) using magnets.

Figure 2A:
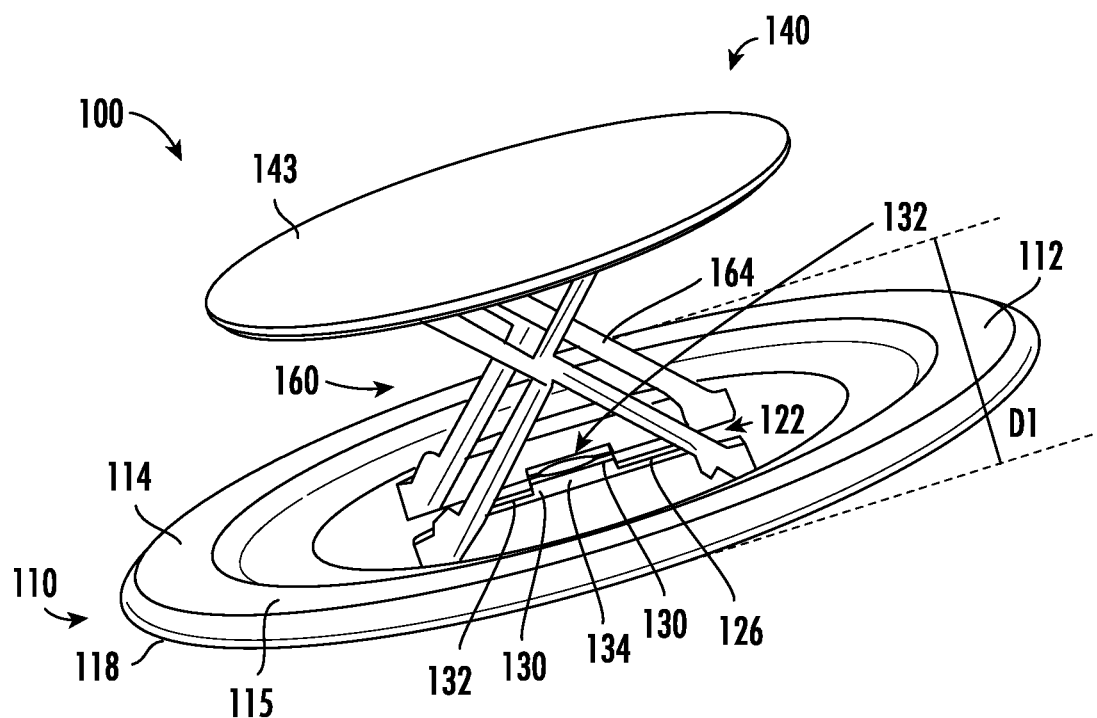
FIGS. 2A and 2B illustrate perspective views of the finger grip of FIG. 1 positioned in a relaxed position.
Figure 2B:
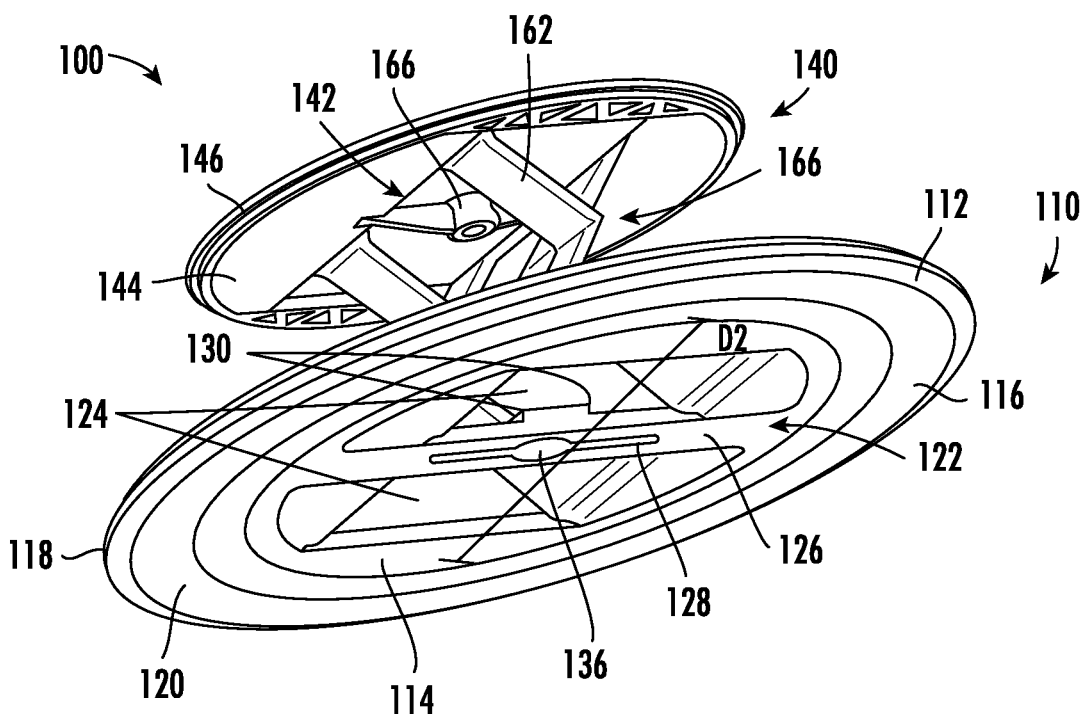

FIGS. 2A and 2B illustrate perspective views of the finger grip 100 of FIG. 1 positioned in a relaxed position. The finger grip 100 includes a base portion 110, a cap portion 140, and a living hinge assembly 160. It will be appreciated that the finger grip 100 represents an example finger grip and other examples may use fewer, additional, or different components or arrangements.

The base portion 110 includes a frame portion 112 and a hub portion 114 that is radially inset from, and rotatably connected to, the frame portion 112. In the illustrated example, the frame portion 112 is implemented as a ringlike member having an exterior edge with an outer diameter, D1, and an interior edge with an inner diameter, D2. D1 and D2 can vary across embodiments. For example, D1 or D2 can be in a range between about 30 mm and about 70 mm, between about 40 mm and about 60 mm, or between about 45 mm and about 55 mm. As another example, D1 or D2 can be greater than 30 mm, greater than 40 mm, greater than 50 mm, greater than 60 mm, greater than 70 mm, less than 30 mm, less than 40 mm, less than 50 mm, less than 60 mm, or less than 70 mm. As another example, D1 or D2 can be about 40, 42.5, 45, 47.5, 50, 52.5, 55, 57.5, 60, 62.5 or 65 mm (+/−about 1 mm).

It will be appreciated that the shape of the frame portion 112 can vary across embodiments. For example, in some cases, the interior edge and/or the exterior edge of the frame portion 112 can be relatively rectangular, elliptical, triangular, polygonal, non-polygonal or irregular in shape. In some cases, the interior edge and/or the exterior edge of the frame portion 112 is complementary to a geometry of magnets located in an electronic device. For example, an electronic device may include a circular array of magnets (e.g., having an outer diameter of about 56-58 millimeters and an inner diameter of about 45-46 millimeters) for facilitating a magnetic connection to the electronic device. In some such cases, the interior edge and/or the exterior edge of the frame portion 112 may have a shape that is complementary to the outer and/or inner diameter of the magnets. By implementing a frame portion 112 having a shape that is complementary to the circular array of magnets in an electronic device, the finger grip 100 can maintain a modest size, while remain large enough to magnetically couple to an electronic device using its magnets. In some cases, the base portion 110 may have a shape that is complementary to a shape of the electronic device. In some cases, as described herein, the base portion 110 may have an interior shape that is complementary to a shape of the cap portion 140.

The frame portion 112 includes a first side 115, a second side 116, and a transitional edge 118 between the first side 115 and the second side 116. Due to the transitional edge 118, an outer perimeter of the first side 115 is different from (e.g., greater than) an outer perimeter of the second side 116. In some cases, the transitional edge 118 makes it easier for a user to disengage the frame portion 112 (and thus the finger grip 100) from an electronic device. For example, the transitional edge 118 may create a small gap under an edge of the frame portion 112, under which a user can insert a fingernail (or other similarly sized object) when disengaging the finger grip 100 from the electronic device. The transitional edge 118 may be implemented in a variety of ways. For example, in some cases, the transitional edge 118 includes a tapered side wall. As another example, the transitional edge 118 can include a chamfered edge or a filleted edge.

At least a portion of the second side 116 (sometimes referred to as the back side) of the frame portion 112 can include an adhesive backing 120. The adhesive backing 120 can include an adhesive, such as a double-sided adhesive substrate, for aiding in attachment of the finger grip 100 to an electronic device or other object. In some cases, the adhesive backing 120 works in tandem with a magnetic connection to couple the finger grip 100 to an electronic device or other object. In this way, the adhesive backing 120 can strengthen the coupling between the finger grip 100 and the electronic device, as compared to an entirely magnetic coupling.

The thickness (T1) of the frame portion 112 can vary across embodiments. For example, T1 can be in a range between about 1 mm and about 4.5 mm, between about 1 mm and about 3.5 mm, or between about 1.25 mm and about 1.75 mm. As another example, T1 can be less than 4.5 mm, less than 4 mm, less than 3.5 mm, less than 3 mm, less than 1.5 mm, less than 1 mm, or less than 1.5 mm. As another example, T1 can be less than 4.5 mm, less than 4 mm, less than 3.5 mm, less than 3 mm, less than 1.5 mm, less than 1 mm, or less than 1.5 mm. As another example, T1 can be about 1.5, 1.75, 1, 1.25, 1.5, 1.75, 2, 2.25, 2.5, 2.75, 3, 3.25, 3.5, 3.75, 4, 4.25, 4.5, 4.75, or 5 mm (+/−about 0.05 mm).

In some cases, the frame portion 112 can include (e.g., fully or partially encapsulate) a circular array of magnets arranged at least partially around a periphery of the frame portion 112. The one or more magnets can include a plurality of arc-shaped magnets disposed in a circular peripheral channel of the frame portion 112. According to certain advantageous embodiments, the size and shape conform of the circular array of magnets conform to the MagSafe® specification. MagSafe® is a magnetic technology specification from Apple, built into the internal engineering of certain iPhone models to create a new ecosystem of accessories for easy attachment and faster wireless charging using magnetic fields.

The hub portion 114 includes a retainer portion 122 for coupling with the cap portion 140. As described in more detail herein, the hub portion 122 is rotatably connected to and separable from the frame portion 112 (e.g., see FIG.

7A). Furthermore, the hub portion 114 defines at least one cavity 124 for receiving a portion of the living hinge assembly 130. As described herein in more detail, the presence of the cavity(ies) 124 provides space into which the living hinge assembly 160 can fold, thereby allowing the finger grip 100 to retain a thickness sufficiently thin to allow wireless charging therethrough.

The retainer portion 122 includes an elongate member 126 that bisects the hub portion 122. The elongate member 126 includes a slit 128 along a central portion. The retainer portion 122 includes a tapered side wall 130 having a first height, H1, above a surrounding surface 132 of the elongate member 126. In the illustrated example, the elongate member 126 includes two curved, tapered side walls 130 positioned in a center of the elongate member 126. It will be understood that, in some cases, the number of tapered side walls may vary. For example, in some cases, the retainer portion 122 includes only one or more than two tapered side walls 130. In some cases, the tapered side wall 130 forms a right angle or an acute angle relative to the surrounding surface of the elongate member 126. In some cases, the tapered side wall 130 forms an obtuse angle relative to the surrounding surface of the elongate member 126. As described herein in more detail (and shown in FIG. 3C, for example), the presence of a tapered side wall 130 provides a raised region behind which to put an edge of the cap portion 140 to thereby secure the finger grip 100 in a kickstand position.

The retainer portion 122 includes an engagement portion 132 for engaging with the cap portion 140, such as with the engagement portion 142. In the illustrated example of FIG. 1, the engagement portion 132 is formed by the tapered side walls 130, which create a female structure 134 that includes an opening 136 and the engagement portion 142 is implemented as a male structure 164 that includes a protrusion 166 opposite the opening 136. In this example, the opening 136 is sixed less than a diameter of the protrusion 166. In this way, as the cap portion 140 is pushed towards the base portion 110 such that the male structure 164 is moved into the female structure 134, the male structure 164 (e.g., protrusion 166) is received and secured by the female structure 134 (e.g., opening 136). Furthermore, as the engagement portion 142 is pushed into the engagement portion 132, the engagement portion 142 exerts an outward pressure on a portion of the engagement portion 132, causing the slit 128 to widen. The slit 128 can advantageously improve the robustness of the retainer portion 122 by introducing force by compression. In some cases, the implementation of the slit 128 advantageously allows for a smaller male structure 164, which allows for a smaller profile of the finger grip 100.

The hub portion 114 is thinner than the frame portion. The thickness of the hub portion 114 can vary across embodiments. For example, the thickness can be in a range between about 0.25 mm and about 2 mm, between about 0.5 mm and about 1.5 mm, or between about 0.75 mm and about 1.25 mm. As another example, the thickness can be less than 2 mm, less than 1.5 mm, less than 1.25 mm, less than 1.1 mm, less than 1.05 mm, less than 1 mm, or less than 0.9 mm. As another example, the thickness can be about 0.5, 0.55, 0.60, 0.65, 0.70, 0.75, 0.80, 0.85, 0.90, 0.95, 1, 1.05, 1.1, 1.15, 1.2, 1.25, 1.3, 1.35, 1.4, 1.45, or 1.5 mm (+/−about 0.0025 mm). The base portion 110 can be made of plastic (e.g., ABS plastic, polycarbonate/acrylonitrile butadiene styrene (PC-ABS)) or any non-ferrous metal (e.g., aluminum, copper, magnesium alloy).

The cap portion 140 is a generally flat, round structure that includes a first surface 143, a second surface 144, and an outer rim 146. The first and second surfaces 142, 144 are opposite and parallel to each other. Although illustrated as circular, the shape of the cap portion 140 can vary across embodiments. For example, the cap portion 140 can be relatively rectangular, elliptical, triangular, polygonal, non-polygonal or irregular in shape. As another example, the cap portion 140 can have a shape of a leaf, a flower, or a particular object. In some cases, the cap portion 140 is a symmetrical shape, while in other cases the cap portion 140 has a non-symmetrical shape. In some cases, the shape of the cap portion 140 is complementary to the interior edge shape of the base portion 110 (e.g., a shape defined by an interior edge of the frame portion 112). In this way, when the cap portion 140 is pressed down into the base portion 110, the cap portion 140 fits within the cavity located above the hub portion 114 and at or below a top surface of the frame portion 112 such that the first surface 142 of the cap portion 140 is substantially flush with a top surface of the frame portion 112.

The first surface 142 is a generally planar surface that faces away from the base portion 110 and may be referred to as an exterior surface of the cap portion 140. Although illustrated as a generally planar surface, it will be understood that the first surface 142 may be non-planar. For example, in some cases, the first surface 142 is textured, has a curved (e.g., concave, convex) profile, defines a stairstep geometry, etc.

The second surface 144 faces the base portion 110. As described herein, the second surface 144 includes an engagement portion 142 for engaging with the base portion 110, such as with the engagement portion 132.

It will be understood that the engagement portions 132 and 142 may be implemented differently across embodiments. For example, the cap portion 140 and base portion 110 can include any coinciding coupling features (e.g., a snap fit pairing, a living hinge and coinciding lip, an interference fit pairing, a hook and loop fastener, a protrusion and slot, a clip, a clamp, a clasp, a buckle, a button, a hook and protrusion, a screw and aperture, a wire, etc.).

The outer rim 146 of the cap portion 140 can be implemented as a transitional edge between the first surface 142 and the second surface 144. The transitional edge can facilitate the disengagement of the cap portion 140 from the base portion 110. For example, the transitional edge may facilitate a user in inserting a fingernail (or similarly sized object) under an edge of the cap portion 140 to disengage the cap portion 140 from the base portion 110. The transitional edge may be implemented in a variety of ways. For example, in some cases, the transitional edge includes a tapered side wall. As another example, the transitional edge can include a chamfered edge or a filleted edge.

The thickness of the cap portion 140 can vary across embodiments. For example, the thickness can be in a range between about 0.25 mm and about 2 mm, between about 0.5 mm and about 1.5 mm, or between about 0.75 mm and about 1.25 mm. As another example, the thickness can be less than 2 mm, less than 1.5 mm, less than 1.2 mm, less than 1.1 mm, less than 1.05 mm, less than 1 mm, or less than 0.9 mm. As another example, the thickness can be about 0.5, 0.55, 0.60, 0.65, 0.70, 0.75, 0.80, 0.85, 0.90, 0.95, 1, 1.05, 1.1, 1.15, 1.2, 1.25, 1.3, 1.35, 1.4, 1.45, or 1.5 mm (+/−about 0.0025 mm).

The living hinge assembly 160 couples to the base portion 110 and to the cap portion 140. The living hinge assembly 160 is a compliant mechanism that provides at least one compliant degree of freedom to allow the cap portion 140.

In some cases, the at least one compliant degree of freedom includes only one compliant degree of freedom. In some cases, the at least one compliant degree of freedom includes more than one compliant degree of freedom, such as two, three, four, or more compliant degrees of freedom. The living hinge assembly 160 allows the finger grip 100 to move between various positions including but not limited to: a captured position (e.g., where the cap portion 140 contacts the base portion 110), a relaxed position (e.g., where the cap portion 140 is separated from the base portion 110), and/or a kickstand position (e.g., where an edge of the cap portion 140 is fitted behind the tapered side wall 130 of the base portion 110). For example, when the finger grip 100 is in the captured positioned and then the cap portion 140 is released from the base portion 110, the living hinge assembly 160 can impart a force that is translated to the cap portion 140 to push the finger grip 100 into the relaxed position. It will be understood that a "relaxed position" is a generalized that refers to any position in which the cap portion 140 is separated from the base portion 110. As such, there are a plurality of relaxed positions, differing by the size of a gap between the cap portion 140 and the base portion 110, as well as an orientation of the cap portion 140 relative to the base portion 110. Similarly, a "kickstand position" can refer to any position in which the cap portion 140 is separated from the base portion 110.

In the illustrated example of FIGS. 2A and 2B, the living hinge assembly 160 includes four segments. Each segment includes an upper flexible member 162 coupled to the cap portion 140, a lower flexible member 164 coupled to the base portion 120, and a living hinge 166 coupling the upper flexible member 162 to the lower flexible member 164. Furthermore, the living hinge assembly 160 includes a living hinge coupling the lower flexible member 164 to the base portion 120 and a living hinge coupling the upper flexible member 162 to the lower flexible member 164. Although the finger grip 100 is illustrated as including a living hinge assembly 160, it will be appreciated that the living hinge assembly 160 can vary across embodiments. For example, the living hinge assembly 160 may include fewer or additional segments. Furthermore, the finger grip 100 may include any other flexure bearing in place of the living hinge assembly 160. For example, in some cases, the finger grip 100 can a leaf spring in place of, or in addition to, the living hinge assembly 160.

Figure 3A:
FIGS. 3A-3C illustrate the finger grip of FIG. 1 in a captured position.
Figure 3B:
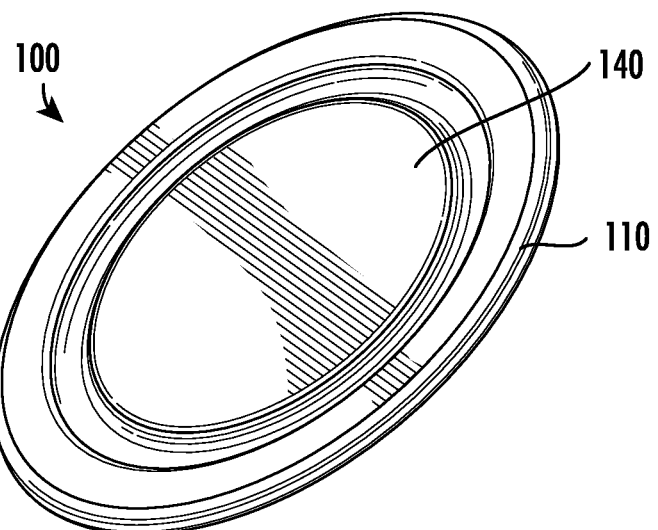
Figure 3C:
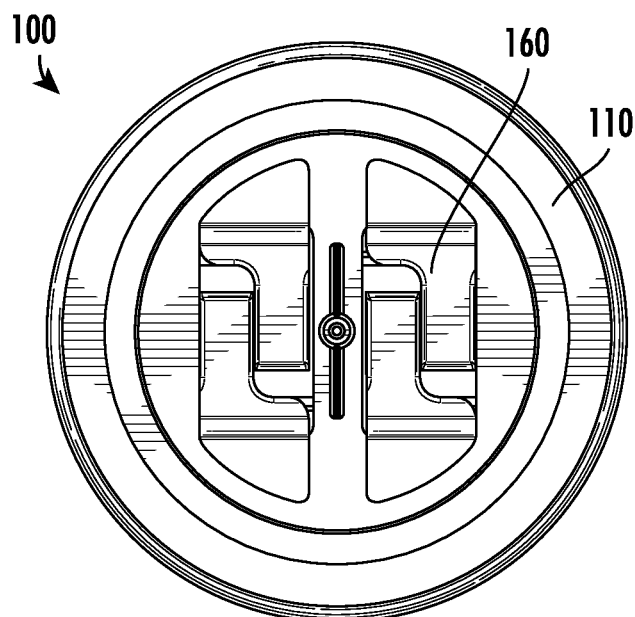

FIGS. 3A-3C illustrate the finger grip 100 of FIG. 1 in a captured position. In the captured position, the cap portion 140 contacts the base portion 110 and the finger grip 100 is compact such that a thickness (302) of the finger grip 100 is sufficiently thin to permit wireless charging through the finger grip 100.

The thickness (302) of the finger grip 100 can vary across embodiments. For example, when the finger grip 100 is in the captured position, the thickness (302) of the finger grip 100 can be in a range between about 1 mm and about 4.5 mm, between about 1 mm and about 3.5 mm, or between about 1.25 mm and about 1.75 mm. As another example, when the finger grip 100 is in the captured position, the thickness (302) of the finger grip 100 can be less than 4.5 mm, less than 4 mm, less than 3.5 mm, less than 3 mm, less than 1.5 mm, less than 1 mm, or less than 1.5 mm. As another example, when the finger grip 100 is in the captured position, the thickness (302) of the finger grip 100 can be less than 4.5 mm, less than 4 mm, less than 3.5 mm, less than 3 mm, less than 1.5 mm, less than 1 mm, or less than 1.5 mm. As another example, when the finger grip 100 is in the captured position, the thickness (302) of the finger grip 100 can be about 1.5, 1.75, 1, 1.25, 1.5, 1.75, 2, 2.25, 2.5, 2.75, 3, 3.25, 3.5, 3.75, 4, 4.25, 4.5, 4.75, or 5 mm (+/−about 0.05 mm).

In some cases, the thickness (302) of the finger grip 100 while in the captured position is sufficiently thin so as to permit wireless charging through the finger grip 100, such that a first device (e.g., a wireless charging device) coupled to the frame portion 112 of the base portion 110 and can provide a charge to a second device (e.g., a smartphone) coupled to the second side 116 on the base portion 110. For example, the thickness (302) of the finger grip 100 while in the captured position can be sufficiently thin so as to permit wireless charging using Qi® or other wireless power transfer standards (e.g., using a MagSafe® Charger).

FIGS. 4A-4D illustrate the finger grip 100 of FIG. 1 in a kickstand position. In the kickstand position, an edge 402 of the cap portion 140 is fitted behind the tapered side wall 412 of the retainer portion 122 of the base portion 110. In the kickstand position, the cap portion 140 can function as a tool (sometimes referred to as a "kickstand") for propping the portable device up on a surface so a user can view the screen hands-free.

The finger grip 100 may include multiple kickstand configurations. For example, in some cases, the finger grip 100 may be symmetrical such that a first kickstand position may be formed by placing a first edge 402 of the cap portion 140 behind a first tapered side wall 412 and a second kickstand position may be formed by placing a second edge 404 of the cap portion 140 behind a second tapered side wall 414. In some cases, the angle of the kickstand (e.g., angle between a plane of the cap portion 140 and a place of the base portion 110) can be the same for the first kickstand position and the second kickstand position. Alternatively, in some cases, the angle of the kickstand for the first kickstand position may be different from the angle of the kickstand for the second kickstand position. For example, the angle for a particular kickstand position can be in a range between about 70 degrees and about 130 degrees, between about 90 degrees and about 120 degrees, or between about 100 degrees and about 110 degrees. As another example, the angle for a particular kickstand position can be about 70, 75, 80, 85, 90, 95, 100, 105, 110, 115, 120, 125, 130, 135, 140, 145, or 150 degrees (+/−about 1 degrees). In some cases, a single tapered side wall 130 may allow for multiple kickstand angles. For example, in some cases, the elongate member 126 can include a plurality of ridges of notches along its length, which the user can select between to selectively angle the cap portion 140 relative to the base portion 110. Depending on the embodiment, the ridges or notches can be positioned behind or in front of the tapered side wall 130. In addition or alternatively, the tapered side wall 13 may include a plurality of ridges or notches.

Figure 5A:
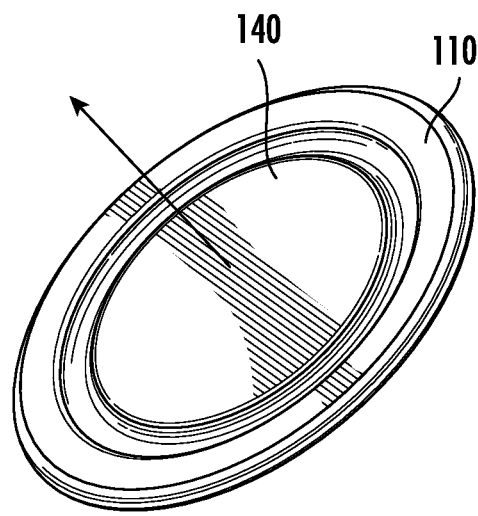
FIGS. 5A-5C illustrate a transitional sequence for shifting the finger grip of FIG. 1 from a captured position to a kickstand position.
Figure 5B:
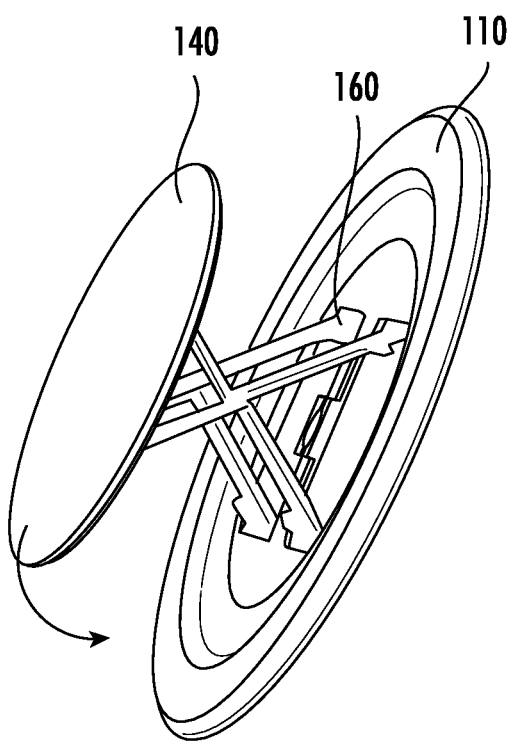
Figure 5C:
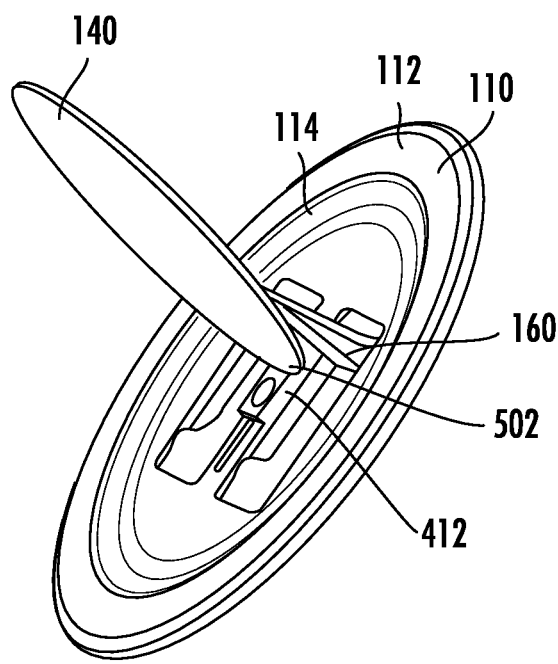

FIGS. 5A-5C illustrate a transitional sequence for shifting the finger grip 100 of FIG. 1 from a captured position to a kickstand position. Starting in the captured state of FIG. 5A, when the user lifts up on one side of the cap portion 140, the cap portion 140 disengages from the base portion 110 and (as a result of elastic body deformation of the living hinge assembly 160) reflexively separates from the base portion 110, as shown in FIG. 5B. When the user rotates the cap portion 140 about 90 degrees and places a pivot edge 502 of the cap portion 140 behind a first tapered side wall 412, the finger grip 100 resides in a kickstand position, as shown in FIG. 5C.

Once the cap portion 140 is moved into place behind the desired tapered side wall 412, the living hinge assembly 160 keeps the cap portion 140 behind the desired tapered side wall 412 in tension. While in the kickstand position, the hub portion 114 is rotatable within the frame portion 112 to allow the user to rotate the kickstand, for example to select between a portrait or landscape orientation.

Figure 4A:
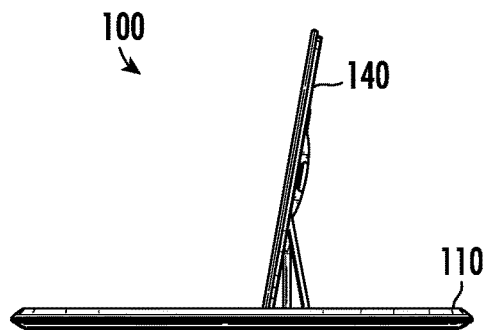
FIGS. 4A-4D illustrate the finger grip of FIG. 1 in a kickstand position.
Figure 4B:
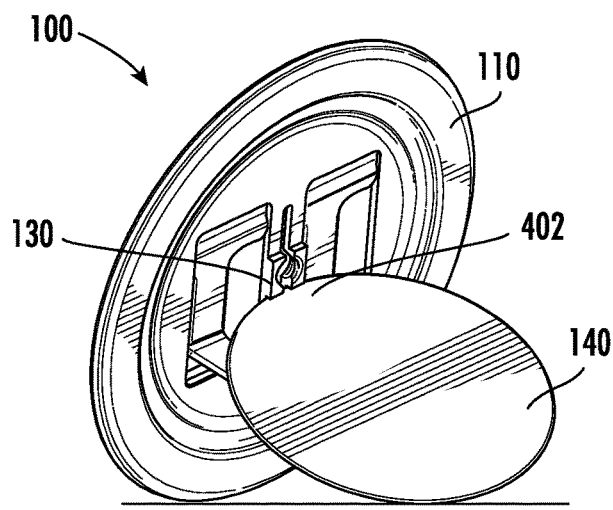
Figure 4C:
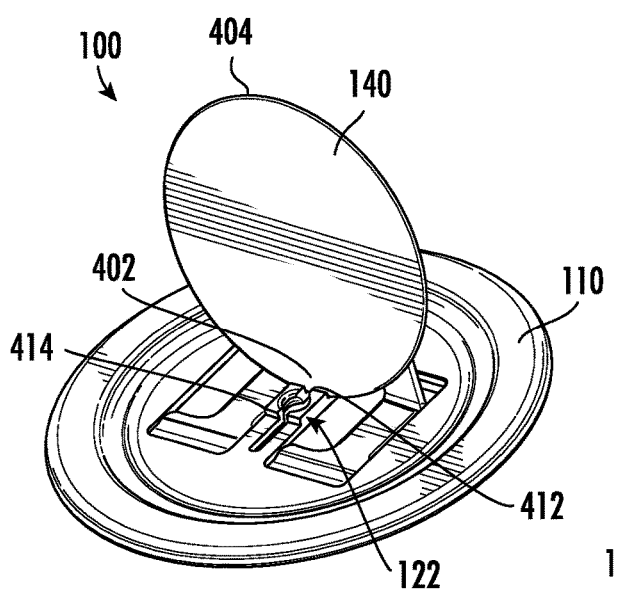
Figure 4D:
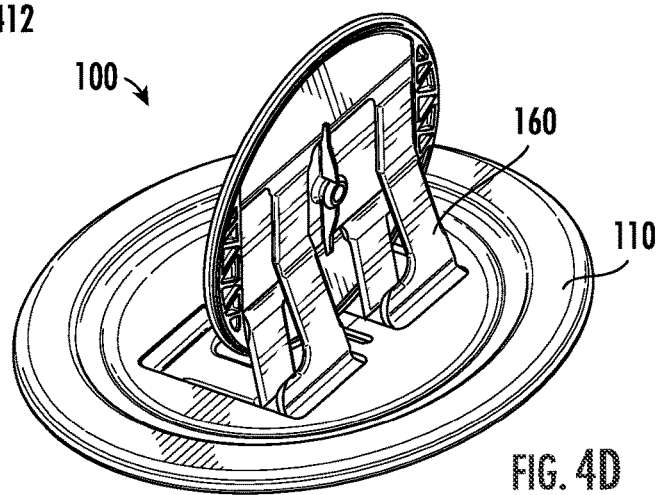

To disengage the kickstand position (sometimes referred to as a kickstand configuration) shown in FIGS. 4C, the user simply lifts the pivot edge 502 of the cap portion 140 over the tapered side wall 412 and the living hinge assembly 160 will reflexively reorient the cap portion 140 so that the finger grip 100 is in a relaxed position.

Figure 6A:
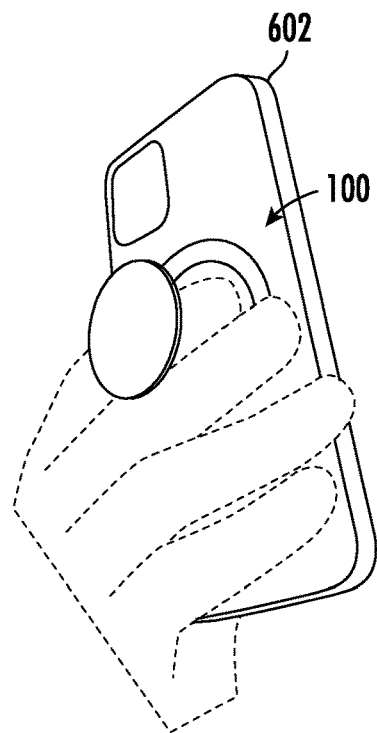
FIGS. 6A-6C illustrate example use of the finger grip for holding a smartphone.
Figure 6B:
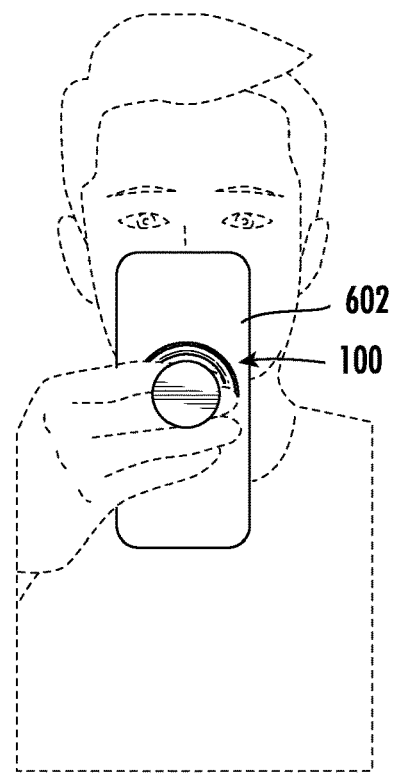
Figure 6C:
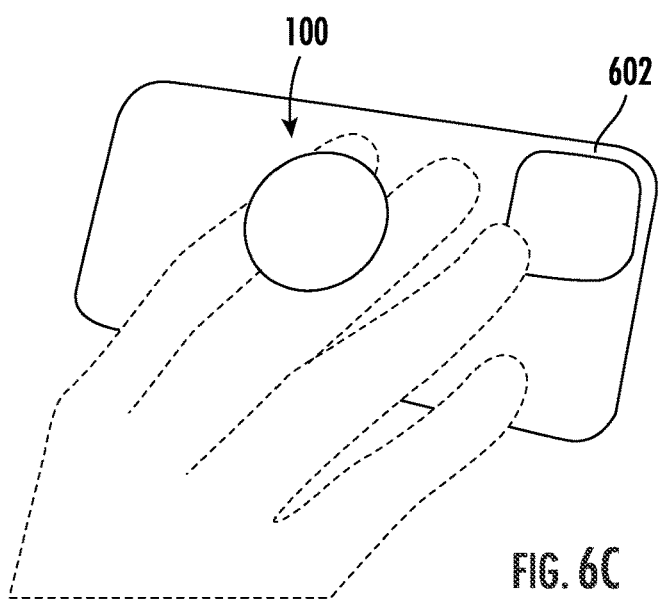

FIGS. 6A-6C illustrate example use of the finger grip 100 for holding a smartphone 602. In particular, FIG. 6A illustrates a single finger between an opening defined by the living hinge assembly 160 (sometimes referred to as a single-finger hold), and FIGS. 6B and 6C illustrate a pair of fingers placed along the sides of the living hinge assembly 160 (sometimes referred to as a two-finger hold). Although only the single-finger hold and the two-finger hold are illustrated, it will be appreciated that the finger grip 100 can be held using various techniques, such any technique that feels comfortable to or functional for a user.

A finger grip can include reusable and disposable elements. A skilled artisan will recognize from the disclosure herein that disposable elements may be reusable, and thus a difference between so-called reusable elements and disposable elements relates to an anticipated longevity difference between the two sets of elements.

Figure 7:
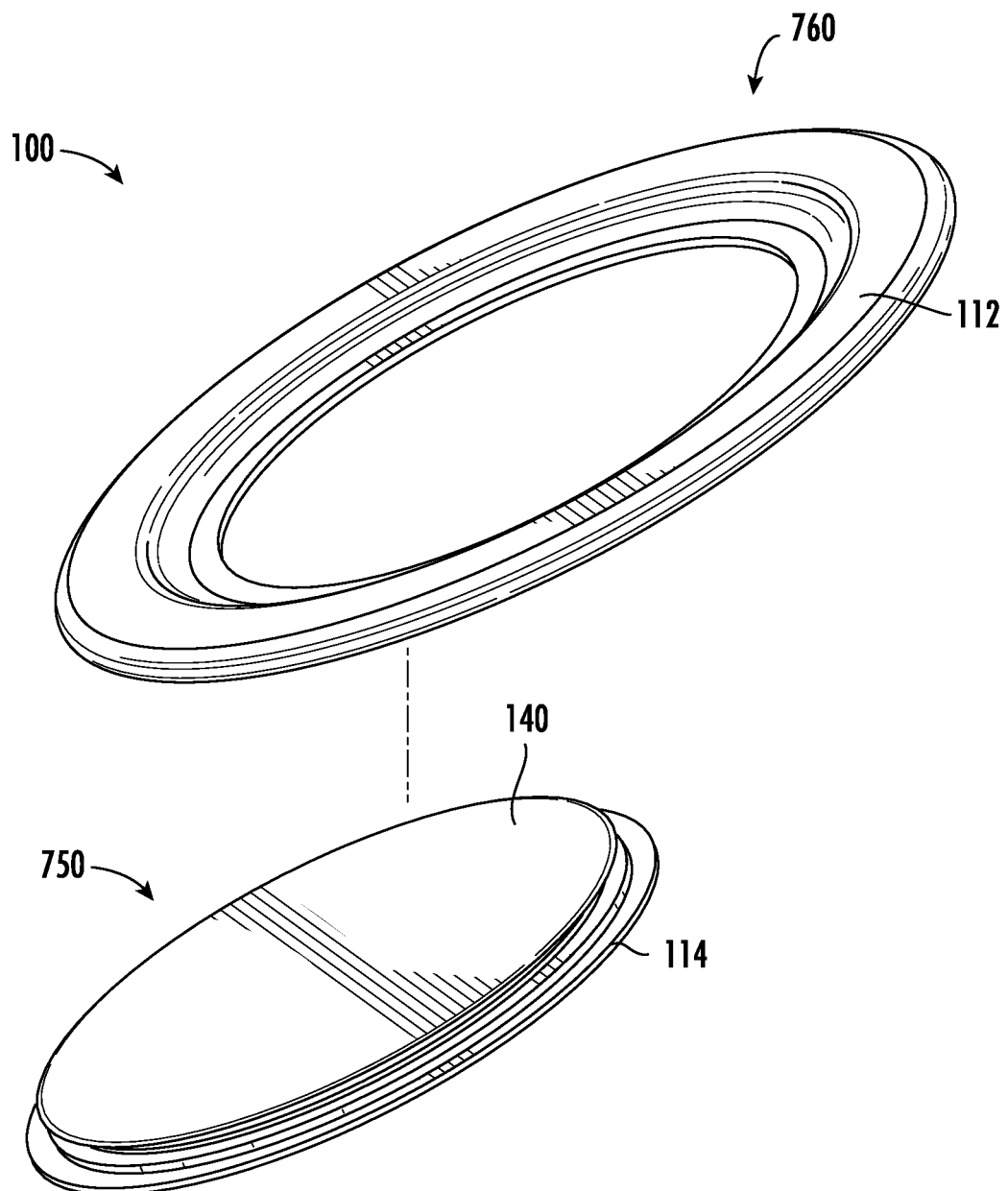
FIG. 7 illustrates an exploded view of the finger grip of FIG. 1.

FIG. 7 illustrates an exploded view of the finger grip 100 of FIG. 1. In particular, FIG. 7 illustrates a disposable element 750 separated from a reusable element 760. The disposable element 750 can generally include those components of the finger grip 100 that are less expensive or more fragile, such as, for example, the cap portion 140, the living hinge assembly 160, and the hub portion 114 of the base portion 110. The reusable element 760 can generally include those components of the finger grip 100 that are more expensive or sturdier, such as, for example, the frame portion 112 of the base portion 110. In some cases, after a number of uses, one or more portions of the disposable element may break or be rendered otherwise inoperable. In some such cases, rather than discarding the entire finger grip 100, another disposable element 750 may be provided to attach to the reusable element 760.

The reusable element 760 can be configured to receive the disposable element 750 in a releasable attachment assembly providing radial displacement between the disposable and reusable elements 750, 760. The radial displacement advantageously allows the disposable element 750 to be rotated relative to the likely fixed position of the reusable element 760. To assemble the finger grip 100, members of the reusable element are mated with assembly mechanisms of the disposable element 750.

In some cases, the reusable element 760 and disposable element 750 can be attached together by placing or snapping protrusions on one element into apertures and receiving slots on the other element. For example, as shown, the disposable element 750 can include protrusions, detents, or tabs extending along an outer perimeter of the disposable element 750 (e.g., along the hub portion 114) and the reusable element 760 can include corresponding apertures along an interior perimeter of the reusable element 760. In some such cases, the disposable element 750 attaches to the reusable element 760 by inserting, or snapping, the protrusions into the apertures. When assembled, at least some of the protrusions are slidable within the receiving slots to allow for radial displacement of the disposable element 750 relative to the reusable element 760.

Figure 8A:
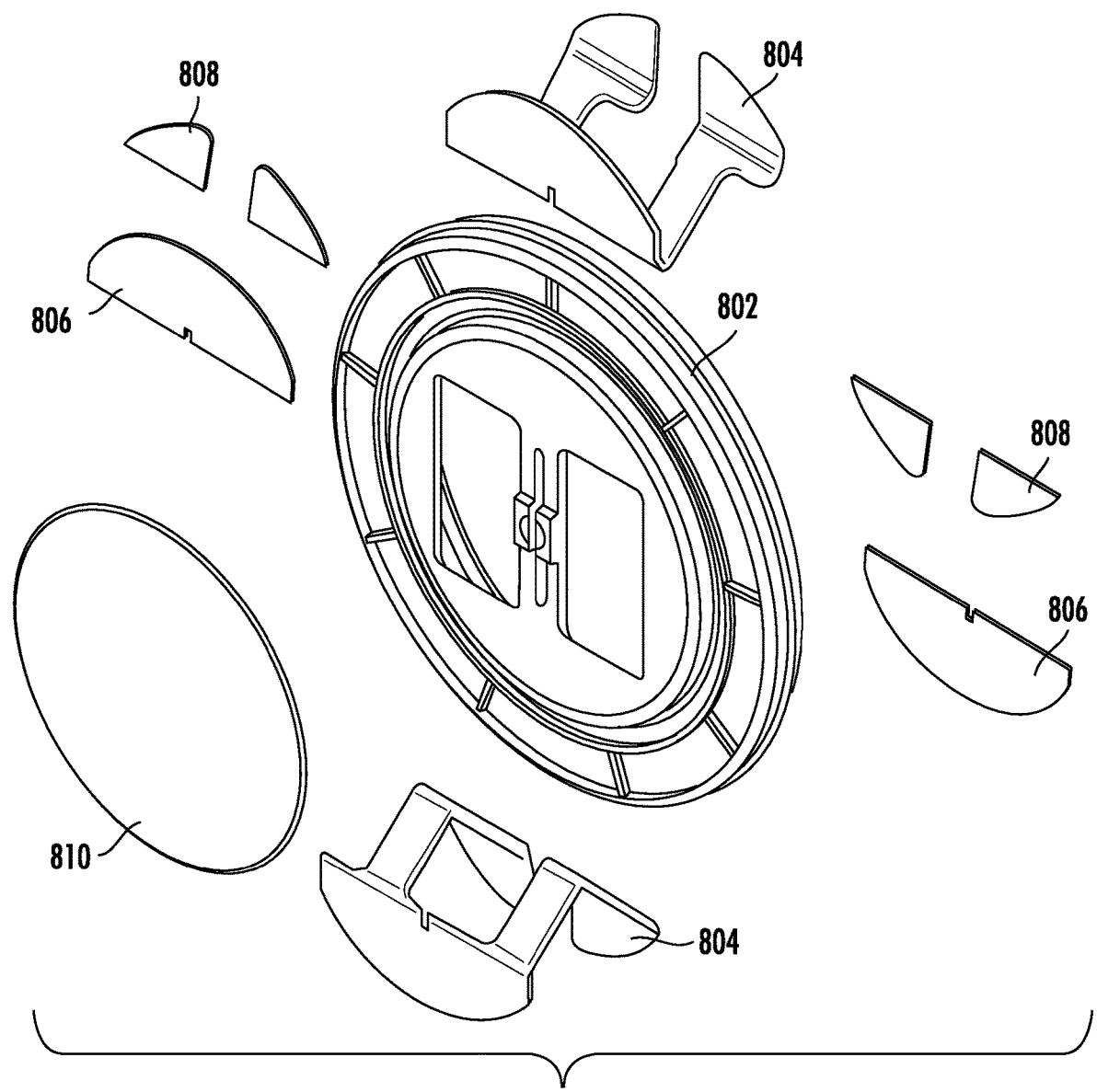
FIGS. 8A and 8B illustrate a front exploded view and a back exploded view, respectively, of an example finger grip.
Figure 8B:
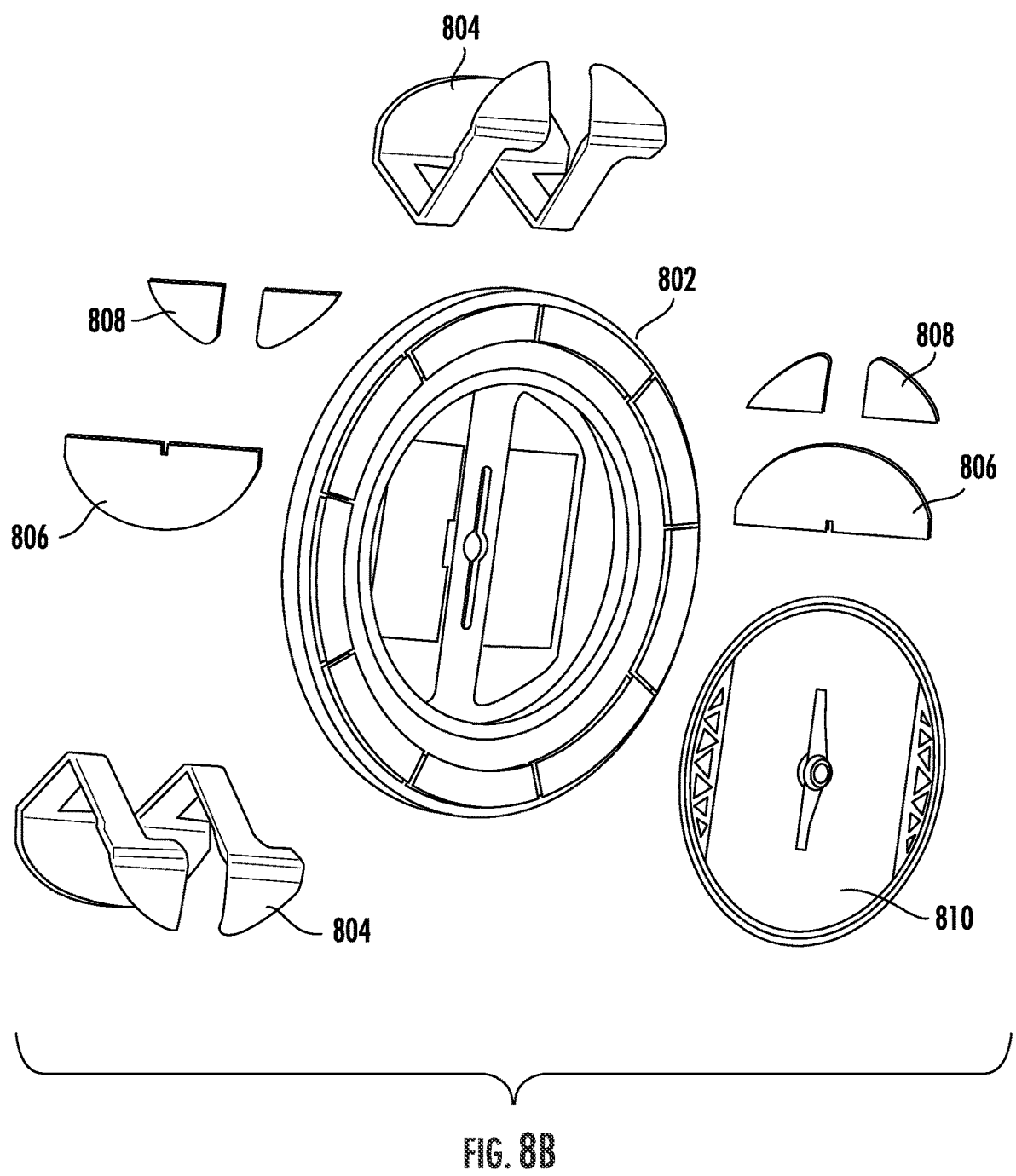

FIGS. 8A and 8B illustrate a front exploded view and a back exploded view, respectively, of an example finger grip 800. It will be appreciated that the finger grip 800 represents an example finger grip and other examples may use fewer, additional, or different components or arrangements. For example, the finger grip 800 may be an embodiment of the finger grip 100. The finger grip 800 includes a base portion assembly (e.g., base 802, base trim 808), a cap portion assembly (e.g., cap front 810, cap trim 806), and a living hinge assembly 804.

Figure 9A:
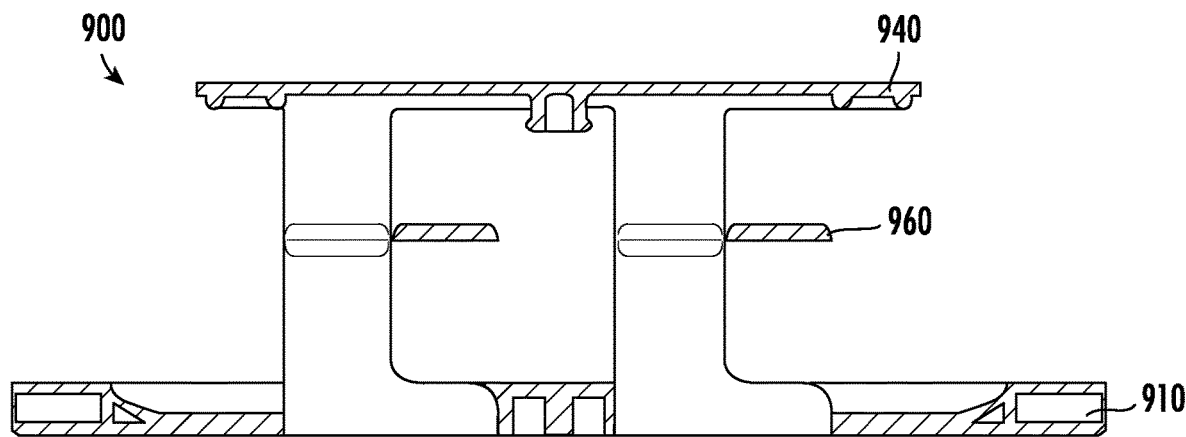
FIGS. 9A and 9B illustrate front and side cross-sectional views, respectively, of an example finger grip.
Figure 9B:
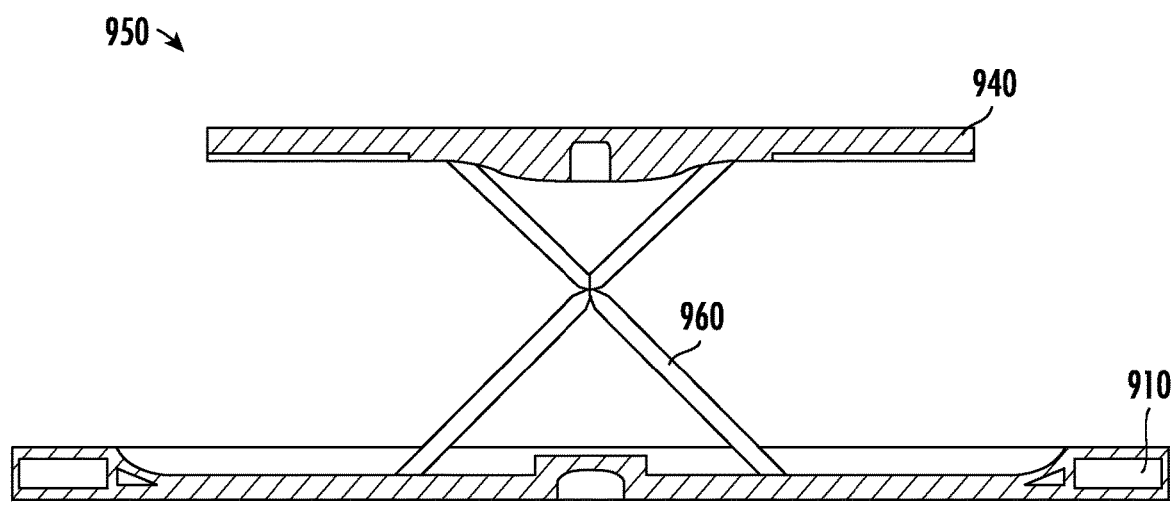

FIGS. 9A and 9B illustrate front and side cross-sectional views, respectively, of an example finger grip 900. It will be appreciated that the finger grip 900 represents an example finger grip and other examples may use fewer, additional, or different components or arrangements. For example, the finger grip 900 may be an embodiment of the finger grip 100.

Figure 10:
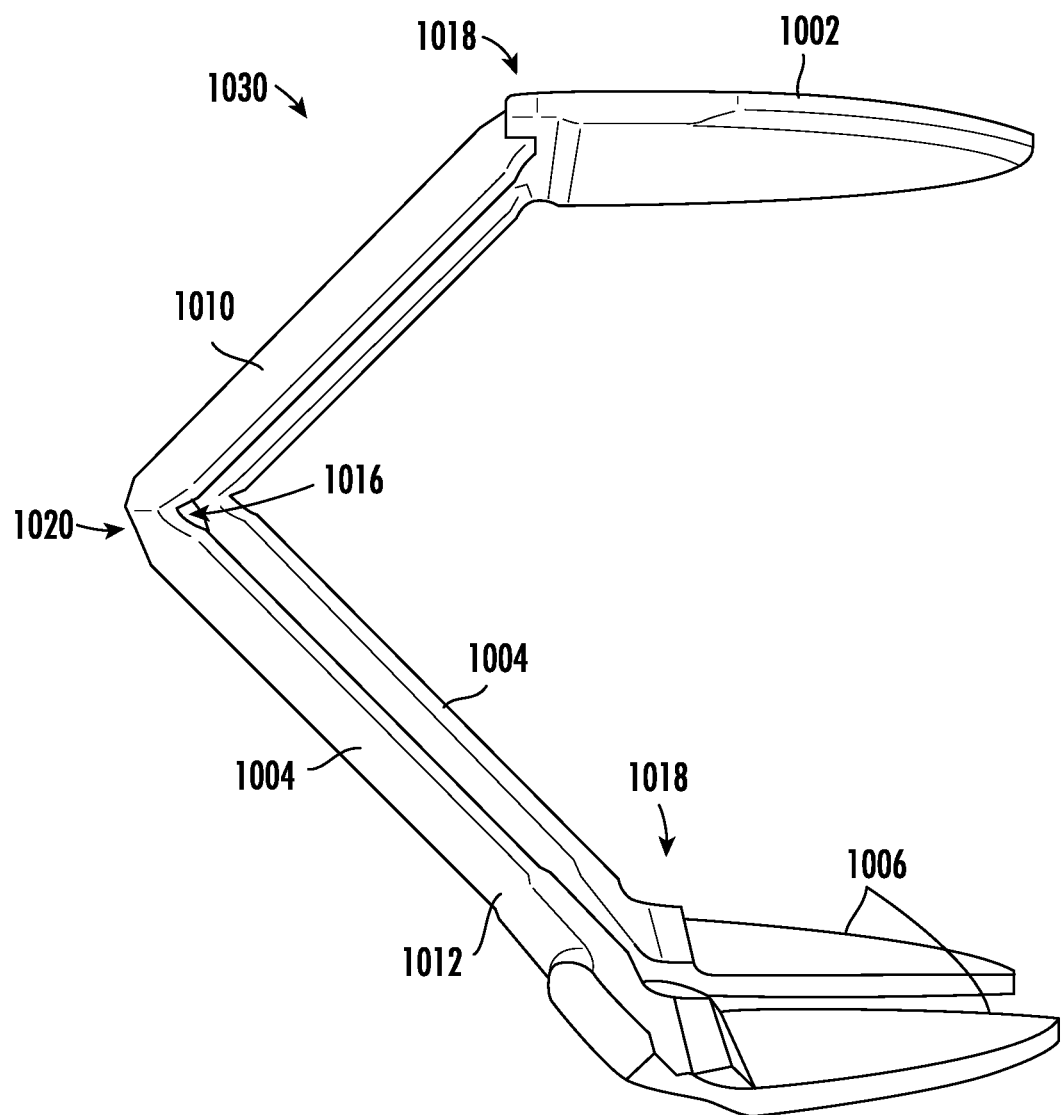
FIG. 10 illustrates an example flexure bearing.

FIG. 10 illustrates an example living hinge assembly 1030. The living hinge assembly 1030 may be an embodiment of a living hinge assembly 160 of FIG. 1. For example, FIG. 1 depicts the finger grip 100 having two living hinge assemblies 1030 facing opposite each other.

The hinge assembly 1030 includes a cap attachment member 1002, two leg segments 1004 extending from the cap attachment member 1002, and respective base attachment members 1006 on each leg segment 1004. Each leg segment 1004 includes an upper flexible member 1010 coupled to the cap attachment member 1002, a lower flexible member 1012 coupled to the base attachment member 1006, and a living hinge 1016 coupling the upper flexible member 1010 to the lower flexible member 1012. The two leg segments 1004 are connected to the cap attachment member 1002 via a living hinge 1016 and are connected to the base attachment member 1006 via a pair of living hinges 1018. The cap attachment member 1002 is configured to attach a cap portion of a finger grip (such as the cap portion 140), and the base attachment member 1006 is configured to attach to a base portion of a finger grip (such as the base portion 110).

Each of the living hinges 1016, 1018 can provide force and/or motion transmission via the upper and/or lower flexible members 1010, 1012 to move the cap attachment member 1002 and/or the base attachment member 1006, which may be attached to a cap portion and a base portion, respectively.

It will be appreciated that the hinge assembly 1030 represents an example flexure bearing and other embodiments may be implemented differently. For example, in some cases, the cap attachment member 1002 may be implemented as two or more cap attachment members, such as one cap attachment member for each leg segment 1004. As another example, the base attachment member 1006 may be implemented as a single base attachment member attached to each leg segment 1004. As another example, the hinge assembly 1030 may include a different number of leg segments, such as one leg segment, three leg segments, or more.

Any of the living hinges 1016, 1018 can include a thinned portion 1020 have a thickness that is thinner than a thickness of the upper flexible member 1010 and thinner than a thickness of the lower flexible member 1012. Any of the living hinges 1016, 1018 can provide force and motion transmission via the upper and lower flexible members 1010, 1012 to move the cap portion 140 to between a captured position and a relaxed position through elastic body deformation. In some cases, one or more of the living hinges 1016, 1018 is a unitary structure formed with the respective upper flexible member 1010 and the lower flexible member 164. Furthermore, one or more of the living hinges 1016, 1018 can be made of polypropylene.

Figure 11:
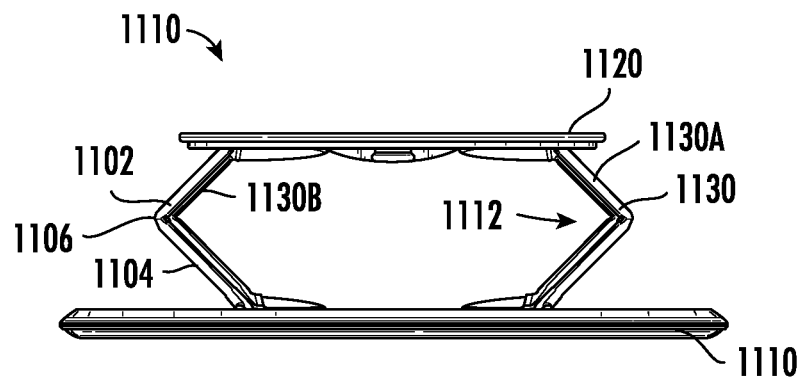
FIG. 11 illustrates an example finger grip in accordance with the present disclosure.

FIG. 11 illustrates an example finger grip 1100 in accordance with the present disclosure. The example finger grip 1100 includes a base portion 1110, a cap portion 1120, and a living hinge assembly 1130. It will be appreciated that the finger grip 1100 represents an example finger grip and other examples may use fewer, additional, or different components or arrangements. For example, the finger grip 1100 may be an embodiment of the finger grip 100 of FIG. 1, the base portion 1110 may be an embodiment of the base portion 110, the cap portion 1120 may be an embodiment of the cap portion 140, and/or the living hinge assembly 1130 may be an embodiment of the living hinge assembly 160.

As described herein, the implementation of the living hinge assembly 1130 may vary across embodiments. In the example of FIG. 11, the living hinge assembly 1130 is implemented as two opposite facing sections 1130A, 1130B. Each section 1130A, 1130B includes a respective upper flexible member 1102 coupled to the cap portion 1120, a respective lower flexible member 1104 coupled to the base portion 1110, and a living hinge 1106 coupling the upper flexible member 1102 to the lower flexible member 1104. The living hinge 1106 provides force and motion transmission via the upper and lower flexible members to move the cap portion 1120 to between a relaxed position and a captured position through elastic body deformation.

As illustrated in FIG. 11, in some cases, the living hinge 1106 includes a thinned portion 1112 have a thickness that is thinner than a thickness of the upper flexible member 1102 and thinner than a thickness of the lower flexible member 1104. In some cases, the living hinge 1106 is a unitary structure formed with the upper flexible member 1102 and the lower flexible member 1104.

As shown, the living hinges 1106 for the respective sections 1130A, 1130B are located on opposite sides of the base portion 1110 and the cap portion 1120 from one another. In a relaxed position, a first living hinge 1106A forms an interior angle that faces an interior angle formed by a second living hinge 1106B. Furthermore, the exterior of the first living hinge 1106A faces away from the second living hinge 1106B, and the exterior of the second living hinge 1106B faces away from the first living hinge 1106A.

Figure 12:
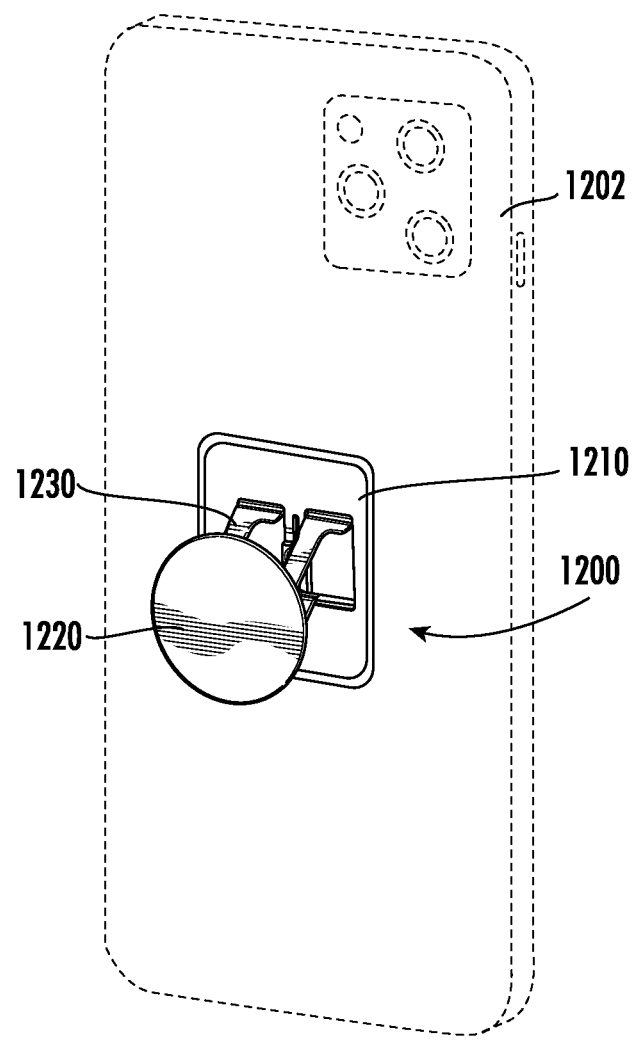
FIG. 12 illustrates an example finger grip in accordance with the present disclosure.

FIG. 12 illustrates an example finger grip 1200 in accordance with the present disclosure. The example finger grip 1200 includes a base portion 1210, a cap portion 1220, and a living hinge assembly 1230. It will be appreciated that the finger grip 1200 represents an example finger grip and other examples may use fewer, additional, or different components or arrangements. For example, the finger grip 1200 may be an embodiment of the finger grip 100 of FIG. 1, the base portion 1210 may be an embodiment of the base portion 110, the cap portion 1220 may be an embodiment of the cap portion 140, and/or the living hinge assembly 1230 may be an embodiment of the living hinge assembly 160.

As described herein, the shape and/or size of the base portion 1210 may vary across embodiments. In the example of FIG. 12, the base portion 1210 is illustrated as having a rectangular shape. In some cases, the base portion 1210 may be even larger so as to encompass a greater surface area of the device to which it attaches. In some such cases, the base portion 1210 may include an adhesive material on at least a portion of its exterior surface. In some cases, the adhesion provides a stronger adhesion force as the surface area of adhesive increases.

In many instances, a user may desire to concurrently use multiple accessories with her electronic device. For example, a user may wish to install a finger grip on the back of her smartphone and then, while the finger grip is installed, use a charger to wireless charge the phone without having to remove the finger grip. The result is a layering of devices, with the bottom layer being the smart phone, the middle layer being the finger grip, and the top layer being the wireless charger. In some such cases, it can be desirable for the connection between the finger grip and the smartphone to be stronger than the connection between the wireless charger and the finger grip. In this way, the user can easily remove the charger from the finger grip without also removing the finger grip from the smartphone.

Figure 13:
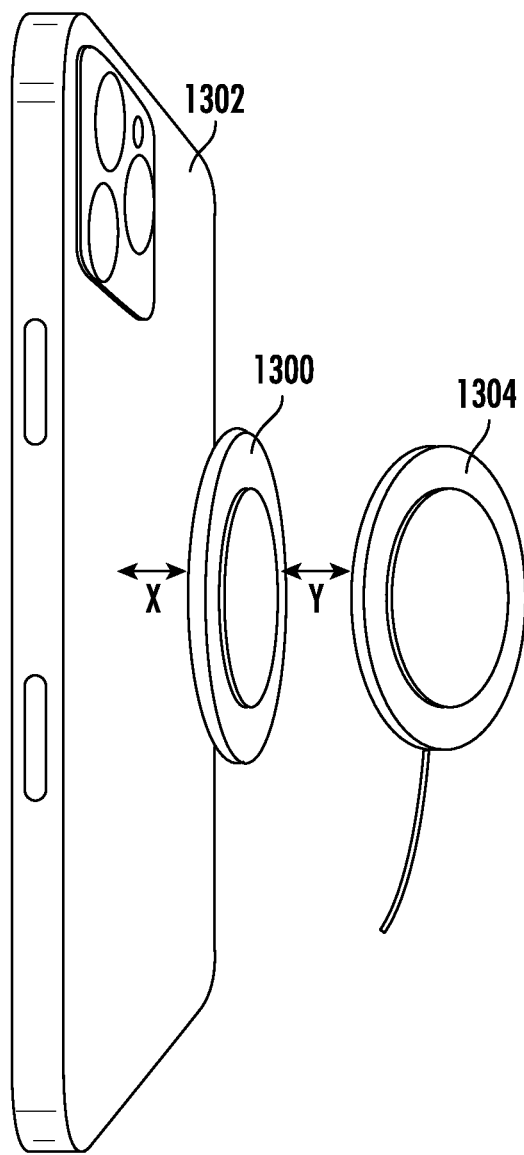
FIG. 13 illustrates relative coupling strength associated with a finger grip.

FIG. 13 illustrates relative coupling strength associated with a finger grip 1300. In this example, the finger grip 1300 is coupled to the back of a mobile device 1302, and a wireless charger 1304 is coupled to the back of the finger grip 1300. The finger grip 1300 may be an embodiment of the finger grip 100 FIG. 1. For example, the finger grip 1300 may be sufficiently thin to permit a charging of the mobile device 1302, via the wireless charger 1304, through the finger grip 1300.

In some cases, the coupling strength between the wireless charger 1304 and the finger grip 1300 is greater than the coupling strength between the mobile device 1302 and the finger grip 1300. For example, the connection between the wireless charger 1304 and the finger grip 1300 may include a combination of magnets and adhesive, while the connection between the mobile device 1302 and the finger grip 1300 may rely solely on magnets. For example, the finger grip 1300 can include an array of multi-polarity arch magnets, where a first set of the magnets have positive polarity and a set of magnets have negative polarity.

Example Embodiments

Various example embodiments of grips can be found in the following clauses:

Clause 1. A grip for coupling to a portable electronic device, the grip comprising:
a base portion;
a cap portion being moveable between a captured position where the cap portion contacts the base portion and a relaxed position where the cap portion is separated from the base portion by a gap; and
a flexure bearing coupled to the base portion and to the cap portion, the flexure bearing providing at least one compliant degree of freedom to allow the cap portion to move from the captured position to the relaxed position.

Clause 2. The grip of any of the preceding clauses, wherein the flexure bearing comprises:
an upper flexible member coupled to the cap portion;
a lower flexible member coupled to the base portion; and
a living hinge coupling the upper flexible member to the lower flexible member.

Clause 3. The grip of clause 2, wherein the living hinge includes a thinned portion have a thickness that is thinner than a thickness of the upper flexible member and thinner than a thickness of the lower flexible member.

Clause 4. The grip of any of clauses 2 or 3, wherein the living hinge provides force and motion transmission via the upper and lower flexible members to move the cap portion to the relaxed position through elastic body deformation.

Clause 5. The grip of any of clauses 2 to 4, wherein the living hinge is a unitary structure formed with the upper flexible member and the lower flexible member.

Clause 6. The grip of any of clauses 2 to 5, wherein the living hinge comprises polypropylene.

Clause 7. The grip of any of the preceding clauses, wherein the flexure bearing comprises a leaf spring.

Clause 8. The grip of any of the preceding clauses, wherein the flexure bearing comprises:

a first living hinge coupled to the base portion and to the cap portion at first locations on a first side of the base portion and on the cap portion, respectively; and a second living hinge coupled to the base portion and to the cap portion at second locations on a second side of the base portion and on the cap portion, respectively, that is opposite the first side.

Clause 9. The grip of clause 8, wherein the first and second living hinges are located on opposite sides of the base portion and the cap portion from one another.

Clause 10. The grip of any of the preceding clauses, wherein the flexure bearing comprises:

a first pair of living hinges coupled to the base portion and to the cap portion at first locations on a first side of the base portion and on the cap portion, respectively; and a second pair of living hinges coupled to the base portion and to the cap portion at second locations on a second side of the base portion and on the cap portion, respectively, that is opposite the first side.

Clause 11. The grip of clause 10, wherein the first and second pairs of living hinges are located on opposite sides of the base portion and the cap portion from one another.

Clause 12. The grip of any of clauses 10 or 11, wherein the first pair of living hinges are coupled to the cap portion and to the base portion by respective upper and lower flexible members at the first locations; and wherein the second pair of living hinges are coupled to the cap portion and to the base portion by respective upper and lower flexible members at the second locations.

Clause 13. The grip of any of clauses 10 to 12, wherein in the relaxed position the first pair of living hinges form respective interior angles that face in opposite directions.

Clause 14. The grip of any of clauses 10 to 13, wherein in the relaxed position the second pair of living hinges form interior angles that face in opposite directions.

Clause 15. The grip of any of clauses 10 to 14, wherein the first pair of living hinges include a first living hinge and a second living hinge that are directly adjacent to one another.

Clause 16. The grip of any of the preceding clauses, further comprising a retainer configured to secure the cap portion to the base portion in the captured position.

Clause 17. The grip of clause 15, wherein the retainer comprises:

a first portion of a snap fit pairing on the cap portion; and a second portion of the snap fit pairing on the base portion.

Clause 18. The grip of any of clauses 15 or 16, wherein the retainer comprises:

a male structure on the cap portion wherein the male structure includes a protrusion having a diameter; and a female structure on the base portion wherein the female structure includes an opening opposite the protrusion, the opening having a size less than the diameter that is configured to secure the cap portion to the base portion in the captured position.

Clause 19. The grip of clause 18, wherein the female structure further includes a tapered side wall having a first height above a surrounding surface of the base portion.

Clause 20. The grip of clause 19, wherein the tapered side wall forms an obtuse angle relative to a surface at an outer edge of the base portion.

Clause 21. The grip of any of clauses 19 or 20, wherein the living hinge further comprises:

a first pair of living hinges coupled to the base portion and to the cap portion at first locations on a first side of the base portion and on the cap portion, respectively; and a second pair of living hinges coupled to the base portion and to the cap portion at second locations on a second side of the base portion and on the cap portion, respectively, that is opposite the first side, wherein the female structure is located between the first and second pairs of living hinges, the grip further comprising:

wherein the cap portion rotates about the first and second pairs of living hinges from the relaxed position to engage an upper surface of the cap portion against the tapered side wall to place the cap portion in a standing position.

Clause 22. The grip of any of clauses 19 to 21, wherein a thickness of the grip is in a range between about 2 mm to about 4 mm when the cap portion is in the captured position.

Clause 23. A grip for coupling to a portable electronic device, the grip comprising:

a base portion;

a cap portion; and a continuous material coupling the base portion and the cap portion, the continuous material comprising a first segment and a second segment separated by a living hinge, the first segment coupled to the base portion and the second segment coupled to the cap portion, wherein a thickness of the grip enables power to be transferred through at least a portion of the grip from a first device to a second device.

Clause 24. A grip for coupling to a portable electronic device, the grip comprising:

a base portion comprising a first engagement member;

a cap portion comprising a second engagement member; and a first continuous material coupling the base portion and the cap portion, wherein the first continuous material comprises a first segment and a second segment separated by a first living hinge, the first segment coupled to the base portion and the second segment coupled to the cap portion, a second continuous material coupling the base portion and the cap portion, wherein the second continuous material comprises a third segment and a fourth segment separated by a second living hinge, the third segment coupled to the base portion and the fourth segment coupled to the cap portion, wherein in a closed orientation, the first continuous material is folded along the first living hinge and the second continuous material is folded along the second living hinge.

Clause 25. A grip for coupling to a portable electronic device, the grip comprising:

a base portion comprising a first engagement member;

a cap portion comprising a second engagement member; and a plurality of continuous materials coupling the base portion and the cap portion, wherein each continuous material comprises a first segment and a second segment separated by a living hinge, the first segment coupled to the base portion and the second segment coupled to the cap portion, wherein the grip is movable through a plurality of configurations, wherein in a first configuration the second engagement member is engaged with the first engagement member and a primary surface of the base portion is parallel to a primary surface of the cap portion, wherein in a second configuration a first end of the cap portion is positioned behind a protrusion of the first engagement member.

Clause 26. The grip of clause 25, wherein in a third configuration, the grip defines a receiving region for receiving a finger, wherein a top portion of the receiving region is defined by the cap, wherein a bottom portion of the receiving region is defined by the base, and wherein a side portion of the receiving region is defined by at least one of the continuous materials.

Clause 27. The grip of clause 25, wherein in a third configuration, the grip defines a first receiving region for receiving a first finger and a second receiving region for receiving a second finger, wherein a top portion of the first and second receiving regions is defined by the cap, wherein a bottom portion of the first and second receiving regions is defined by the base, wherein a side portion of the first receiving region is defined a first one of the continuous materials, and wherein a side portion of the second receiving region is defined a second one of the continuous materials.

Clause 28. A grip for coupling to a portable electronic device, the grip comprising:

a grip having a thickness for allowing power to be transferred from a first device to a second device, through at least a portion of the grip wherein a first side of the base portion is configured for a first connection with a portable electronic device, wherein the first connection comprises an adhesive connection and a magnetic connection;

wherein a second side of the base portion is configured for a second connection with a portable electronic device, wherein the second connection comprises a magnetic connection;

wherein the first connection is stronger than the second connection such that decoupling the second device from the grip does not decouple the grip from the portable electronic device.

Clause 29. The grip of any of the preceding clauses, wherein the first device is a charging device, and wherein the second device is a portable electronic device coupled to the grip.

Clause 30. The grip of any of the preceding clauses, wherein the thickness of the grip is less than 2.5 mm.

Clause 31. The grip of any of the preceding clauses, wherein when the thickness refers to a distance between a bottom surface of the base portion and a top surface of the cap portion when the grip is in a closed position.

Clause 32. The grip of any of the preceding clauses, wherein the grip comprises a plurality of orientations, wherein the thickness of the grip is a thickness of the grip when the grip is positioned in a first orientation of the plurality of orientations.

Clause 33. The grip of any of the preceding clauses, wherein in the first orientation, the continuous material is folded along the living hinge and the first segment is flush with the second segment.

Clause 34. The grip of any of the preceding clauses, wherein the base portion comprises a first engagement portion, wherein the cap portion comprises a second engagement portion, wherein in the first orientation the second engagement portion mates with the first engagement portion, thereby removably securing the grip in the first position.

Clause 35. The grip of any of the preceding clauses, wherein the first engagement portion comprises a first portion of a snap fit pairing, and wherein the second engagement portion comprises a second portion of the snap fit pairing.

Clause 36. The grip of any of the preceding clauses, wherein the first engagement portion comprises a first portion of a snap fit pairing, and wherein the second engagement portion comprises a second portion of the snap fit pairing.

Clause 37. The grip of any of the preceding clauses, wherein the first engagement portion comprises a first portion of a press fit latch, and wherein the second engagement portion comprises a second portion of the press fit latch.

Clause 38. The grip of any of the preceding clauses, wherein when the grip is in the first orientation, a force exerted on the cap portion in a first direction disengages the second engagement portion from the first engagement portion and actuates the living hinge to move the cap portion the first direction.

Clause 39. The grip of any of the preceding clauses, wherein in a second orientation of the plurality of orientations, the grip defines a receiving region for receiving a finger, wherein a top portion of the receiving region is defined by the cap, wherein a bottom portion of the receiving region is defined by the base, and wherein a side portion of the receiving region is defined by the living hinge.

Clause 40. The grip of any of the preceding clauses, wherein in a second orientation of the plurality of orientations, the grip is configured with receive a pair of fingers between the base orientation and the cap, and at least partially around at least a portion of the living hinge.

Clause 41. The grip of any of the preceding clauses, wherein the living hinge is a first living hinge, wherein the continuous material further comprises:

a third segment separated from the first segment by a second living hinge, wherein the third segment is coupled to the base portion; and a fourth segment separated from the second segment by a third living hinge, wherein the fourth segment is coupled to the cap portion.

Clause 42. The grip of any of the preceding clauses, wherein the living hinge is a first living hinge, wherein the continuous material is a first continuous material, wherein the grip further comprises a second continuous material comprising a third segment and a fourth segment separated by a second living hinge, and wherein the third segment is coupled to the base portion and the fourth segment coupled to the cap portion.

Clause 43. The grip of any of the preceding clauses, wherein the living hinge is a first living hinge, wherein the continuous material is a first continuous material, wherein the grip further comprises a second continuous material comprising a third segment and a fourth segment separated by a second living hinge, and wherein the third segment is coupled to the base portion and the fourth segment coupled to the cap portion.

Clause 44. The grip of any of the preceding clauses, wherein an interior of the first living hinge facing a first direction, and wherein an interior of the second living hinge faces a second direction that is opposite the first direction.

Clause 45. The grip of any of the preceding clauses, wherein the continuous material comprises a plurality of interleaved continuous materials, wherein each continuous material comprises a living hinge.

Clause 46. The grip of any of the preceding clauses, wherein the hinges are offset with each other.

Clause 47. The grip of any of the preceding clauses, wherein the base portion is configured to couple to a frame portion, wherein the frame portion comprises a first magnetic interface for coupling to a second magnetic interface of the second device.

Clause 48. The grip of any of the preceding clauses, wherein the frame portion further comprises an adhesive for coupling to the second device.

Clause 49. The grip of any of the preceding clauses, wherein the base portion comprises a first engagement portion extending at least partially around a perimeter of the base portion, wherein the frame defines an interior region comprises a second engagement portion, and wherein first engagement portion is configured to removably mate with the second engagement portion.

Clause 50. The grip of any of the preceding clauses, wherein the base portion is rotatably mounted within the frame portion such that the grip is rotatable about a central axis relative to the frame portion.

Clause 51. The grip of any of the preceding clauses, wherein in a kickstand orientation of the plurality of orientations, the cap portion is oriented substantially perpendicular to the base portion.

Clause 52. The grip of any of the preceding clauses, wherein in the kickstand orientation, a first end of the cap portion is positioned behind a protrusion of the base portion, and a second end that is opposite the first end is in the air.

Clause 52. A grip as shown in the figures and/or describes in the specification.

Clause 53. A method of using the grip of any of the preceding clauses.

Clause 54. A method of manufacturing the grip of any of the preceding clauses.

Terminology

Any terms generally associated with circles, such as "radius" or "radial" or "diameter" or "circumference" or "circumferential" or any derivatives or similar types of terms are intended to be used to designate any corresponding structure in any type of geometry, not just circular structures. For example, "radial" as applied to another geometric structure should be understood to refer to a direction or distance between a location corresponding to a general geometric center of such structure to a perimeter of such structure; "diameter" as applied to another geometric structure should be understood to refer to a cross sectional width of such structure; and "circumference" as applied to another geometric structure should be understood to refer to a perimeter region. Nothing in this specification or drawings should be interpreted to limit these terms to only circles or circular structures.

Terms such as "substantially," "about," "approximately" or the like as used in referring to a relationship between two objects is intended to reflect not only an exact relationship but also variances in that relationship that may be due to various factors such as the effects of environmental conditions, common error tolerances, manufacturing variances, or the like. It should further be understood that although some values or other relationships may be expressed herein without a modifier, these values or other relationships may also be exact or may include a degree of variation due to various factors such as the effects of environmental conditions, common error tolerances, manufacturing variances, or the like. For example, when referring to thickness of the finger grip, or one or more components thereof, about a specified thickness can, in some contexts, refer to a thickness variation of around less than 10% (such as a variation of 10%, 5%, 4%, 3%, 2%, 1% or 0.5%) from the specified thickness. Accordingly, an about 3 mm thickness can refer to 3 mm±0.3 mm, 3 mm±0.15 mm, 3 mm±0.012 mm, 3 mm±0.019 mm, 3 mm±0.006 mm, or 3 mm±0.03 mm. As another example, when referring to a diameter, about a specified distance can, in some contexts, refer to a thickness variation of around less than 10% (such as a variation of 10%, 5%, 4%, 3%, 2%, 1% or 0.5%) from the specified distance. Accordingly, an about 50 mm thickness can refer to 50 mm±5 mm, 50 mm±2.5 mm, 50 mm±2 mm, 50 mm±1.5 mm, 50 mm±1 mm, or 50 mm±0.5 mm. As a further example, when referring to an angle of a kickstand, about a specified angle can, in some contexts, refer to an angle variation of around less than 10% (such as a variation of 10%, 5%, 4%, 3%, 2%, 1% or 0.5%) from the specified angle. Accordingly, an about 70 degrees can refer to 70°±7°, 70°±3.5°, 70°±2.8°, 70°±2.1°, 70°±1.4°, or 70°±0.7°.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Unless the context clearly requires otherwise, throughout the description and the claims, the words "include," "can include," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or" in reference to a list of two or more items, covers all of the following interpretations of the word: any one of the items in the list, all of the items in the list, and any combination of the items in the list. Likewise the term "and/or" in reference to a list of two or more items, covers all of the following interpretations of the word: any one of the items in the list, all of the items in the list, and any combination of the items in the list.

Disjunctive language such as the phrase "at least one of X, Y, or Z," unless specifically stated otherwise, is otherwise understood with the context as used in general to present that an item, term, etc., may be either X, Y, or Z, or any combination thereof (non-limiting examples: X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the Detailed Description f has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described elsewhere herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

These and other changes can be made to the invention in light of the Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

What is claimed is:

1. A grip for coupling to a portable electronic device, the grip comprising:
   a base portion coupleable to the portable electronic device;
   a cap portion being moveable between a first position where the cap portion contacts the base portion and a second position where the cap portion is separated from the base portion by a gap; and
   a flexure bearing coupled to the base portion and to the cap portion, the flexure bearing providing at least one compliant degree of freedom to allow the cap portion to move from the first position to the second position, the flexure bearing comprising at least two pairs of legs, each pair of legs comprising a first leg including a first living hinge and a second leg including a second living hinge, wherein the first legs of each pair are on a first side and the second legs of each pair are on a second, opposite side,
   wherein in the second position, the first living hinge forms an interior angle that faces a first direction and the second living hinge forms an interior angle that faces a second direction that opposes the first direction.

2. The grip of claim 1, wherein each leg of the at least two pairs of legs comprises:
   an upper flexible member coupled to the cap portion;
   a lower flexible member coupled to the base portion; and
   a living hinge coupling the upper flexible member to the lower flexible member.

3. The grip of claim 1, wherein the first and second living hinges include a thinned portion having a thickness that is thinner than a thickness of other portions of the respective leg.

4. The grip of claim 1, wherein the first and second living hinges provide force and motion transmission to move the cap portion to the second position through elastic body deformation.

5. The grip of claim 1, wherein each leg is a unitary structure.

6. The grip of claim 1, further comprising a retainer configured to secure the cap portion to the base portion in the first position, wherein the retainer comprises:
   a first portion of a snap fit pairing on the cap portion; and
   a second portion of the snap fit pairing on the base portion.

7. The grip of claim 6, wherein the retainer comprises:
   a male structure on the cap portion wherein the male structure includes a protrusion having a diameter; and
   a female structure on the base portion wherein the female structure includes an opening opposite the protrusion, the opening having a size less than the diameter.

8. The grip of claim 1, wherein a thickness of the grip is in a range between about 2 mm to about 4 mm when the cap portion is in the first position.

9. The grip of claim 1, wherein a thickness of the grip is less than 2.5 mm when the cap portion is in the first position.

10. The grip of claim 1, wherein a thickness of the grip is less than 3 mm when the cap portion is in the first position.

11. The grip of claim 1, wherein in the second position, the interior angle of the first living hinge faces the second living hinge.

12. The grip of claim 1, wherein in the second position, the interior angle of the first living hinge faces away from the second living hinge.

13. The grip of claim 1, wherein the at least two pairs of legs comprise at least three pairs of legs.

14. The grip of claim 1, wherein the base portion defines at least one cavity for retaining at least a portion of the legs of the flexure bearing while the grip is in the first position.

15. The grip of claim 1, wherein a thickness of the grip enables power to be transferred through at least a portion of the grip from a charging device to the portable electronic device using a Qi® wireless power transfer standard.

16. The grip of claim 1, wherein in the first position, at least a portion of each leg of the at least two pairs of legs intersects a common plane that is perpendicular to a longitudinal plane of the base portion.

17. The grip of claim 1, wherein the base portion comprises a kickstand protrusion extending therefrom, wherein the cap portion is movable to a kickstand position in which the cap portion is oriented at an angle relative to the base portion, and an edge of the cap portion is abutted against the kickstand protrusion to securely hold the cap portion behind the kickstand protrusion.

18. The grip of claim 1, wherein the base portion comprises a frame portion and a hub portion that is radially inset from and rotatably coupled to the frame portion.

19. The grip of claim 18, wherein the flexure bearing is coupled to the hub portion of the base portion.

20. The grip of claim 18, wherein the hub portion comprises one or more protrusions positioned along at least a portion of an outer perimeter of the hub portion, wherein the frame portion comprises a circumferential recess extending along at least a portion of an inner perimeter of the frame portion, and wherein the one or more protrusions of the hub portion are rotatably coupled with the circumferential recess of the frame portion such that the hub portion is rotatable about a central axis relative to the frame portion.

21. The grip of claim 18, wherein the frame portion comprises a circular array of magnets.

22. The grip of claim 18, wherein the frame portion comprises a first side that faces the cap portion and a second side that is opposite the first side, wherein the second side comprises an adhesive.

23. The grip of claim 1, wherein the grip is compliant with a Qi® wireless charging standard, thereby enabling wireless charging of an electronic device through both the cap portion and the base portion of the grip when the grip is in the first position.

24. The grip of claim 1, wherein the grip is compliant with a MagSafe® wireless charging standard, thereby enabling wireless charging of an electronic device through both the cap portion and the base portion of the grip when the grip is in the first position.

* * * * *